(12) United States Patent  (10) Patent No.:     US 7,877,887 B2
Watson                              (45) Date of Patent:      Feb. 1, 2011

(54) METHOD AND SYSTEM FOR HEADING INDICATION WITH DRIFT COMPENSATION

(75) Inventor: William S. Watson, Eau Claire, WI (US)

(73) Assignee: Watson Industries, Inc., Eau Claire, WI (US)

( * ) Notice: Subject to any disclaimer, the term of this patent is extended or adjusted under 35 U.S.C. 154(b) by 396 days.

(21) Appl. No.: 11/939,153

(22) Filed: Nov. 13, 2007

(65) Prior Publication Data

US 2009/0119937 A1    May 14, 2009

(51) Int. Cl.
  *G01C 19/38*   (2006.01)
  *E21B 47/022*  (2006.01)
(52) U.S. Cl. .............................. 33/326; 33/356; 33/324; 702/92
(58) Field of Classification Search .................... 33/324, 33/326, 356; 702/92, 104, 150
See application file for complete search history.

(56) References Cited

U.S. PATENT DOCUMENTS

| | | | |
|---|---|---|---|
| 3,346,966 A | 10/1967 | Gates | |
| 3,753,296 A | 8/1973 | Van Steenwyk | |
| 3,890,718 A | 6/1975 | Gregerson et al. | |
| 4,199,869 A | 4/1980 | Van Steenwyk | |
| 4,231,252 A | 11/1980 | Cherkson | |
| 4,511,848 A * | 4/1985 | Watson | 329/349 |
| 4,537,067 A | 8/1985 | Sharp et al. | |
| 4,611,405 A | 9/1986 | Van Steenwyk | |
| 4,614,040 A | 9/1986 | Hyulsing, II et al. | |
| 4,920,655 A | 5/1990 | Van Steenwyk | |
| 5,117,559 A | 6/1992 | Sindlinger et al. | |
| 5,194,872 A | 3/1993 | Musoff et al. | |
| 5,272,922 A | 12/1993 | Watson | |
| 5,287,295 A * | 2/1994 | Ives et al. | 702/92 |

(Continued)

FOREIGN PATENT DOCUMENTS

| | | |
|---|---|---|
| EP | 0 056 447 A1 | 10/1981 |
| EP | 0 250 608 B1 | 3/1990 |

OTHER PUBLICATIONS

Partial European Search Report, dated Mar. 5, 2009.

(Continued)

*Primary Examiner*—Amy Cohen Johnson
(74) *Attorney, Agent, or Firm*—Patterson Thuente Christensen Pedersen, P.A.

(57) ABSTRACT

An apparatus and method for compensation of the effects of various bias errors encountered by inertial rate gyroscopes, particularly vibrating element gyroscopes, configured to detect heading relative to true north. Certain embodiments are suitable for reducing rotational dynamic errors associated with rotating gyroscopes. Other embodiments may include compensation of biases not related to rotational dynamics, such as thermal drift. The various methods disclosed may also account for the bias by sampling the rotational vector of the earth at an arbitrary heading, and at a heading that is 180° offset from the arbitrary heading. The sequence may be repeated numerous times to compensate for bias drift. The bias drift may be constant with respect to time (linear) or changing over time (non-linear) during the data acquisition sequence. Some embodiments include methods that utilize data from accelerometers to infer the bank and elevation angles as well as earth latitude location relative to the equator.

4 Claims, 10 Drawing Sheets

U.S. PATENT DOCUMENTS

| | | | |
|---|---|---|---|
| 5,375,336 | A | 12/1994 | Nakamura |
| 5,789,671 | A | 8/1998 | Fernandez |
| 5,806,195 | A | 9/1998 | Uttecht et al. |
| 6,347,282 | B2* | 2/2002 | Estes et al. .............. 702/6 |
| 6,529,834 | B1* | 3/2003 | Estes et al. .............. 702/9 |
| 6,918,186 | B2* | 7/2005 | Ash et al. .............. 33/313 |
| 7,801,704 | B2* | 9/2010 | Sato et al. .............. 702/189 |
| 2003/0014874 | A1 | 1/2003 | Brunstein et al. |
| 2005/0126022 | A1 | 6/2005 | Hansberry et al. |
| 2010/0198518 | A1* | 8/2010 | Ekseth et al. .............. 702/6 |

OTHER PUBLICATIONS

N.P. Callas, "Computing Directional Surveys with a Helical Method" Society of Petroleum Engineers Journal, Dec. 1976, pp. 327-336.

John Wright, "Rate Gyro Surveying of Wellbores in the Rocky Mountains" Society of Petroleum Engineers, 1983, pp. 269-275.

F. L. Gibbons; U. Hense; Eastman Christensen, "A Three-Axis Laser Gyro System for Borehole Wireline Surveying" Society of Petroleum Engineers, 1987, pp. 277-282.

Small-Diameter Inertial-Grade sensors significantly enhance Wellbore Survey Accuracy, pp. 223-232.

Peter L. Cook, "Monitoring the Three-Dimensional Position and Three-Axis Rotation of Submerged Structures" Society of Petroleum Engineers of AIME, Aug. 1981, pp. 1557-1564.

G.W. Uttecht, J. P. Dewardt "Application of Small-Diameter Inertial Grade Gyroscopes Significantly Reduces Borehole Position Uncertainty" IADC/SPE, 1983, pp. 31-40.

David John Camden; Jean-Eugene Gartner, "A New Continuous Guidance Tool Used for High Accuracy Directional Surveys" Society of Petroleum Engineers of AIME, 1981.

J. B. Kelsey, "A Wellbore Inertial Navigation System" IADC/SPE, 1983.41-46.

Anthony C. Scott; John W. Wright, "A New Generation Directional Survey System Using Continuous Gyrocompassing Techniques" Society of Petroleum Engineers of AIME, 1982, pp. 1-8.

M. Thorp, "An Analysis of Discrepancies Between Gyro Surveys" SPE/IADC, 1987.

J. L. Thorogood, "Discussion of Evaluation of Directional Survey Errors at Prudhoe Bay" SPE Drilling Engineer, Sep. 1988, pp. 334-335.

Mark A. Stephenson; Harry Wilson "Improving Quality Control of Directional Survey Data with Continuous Inertial Navigation" SPE Drilling Engineering, Jun. 1992, pp. 100-106.

European Office Action (EP 08 253 680.6), dated Oct. 13, 2010.

* cited by examiner

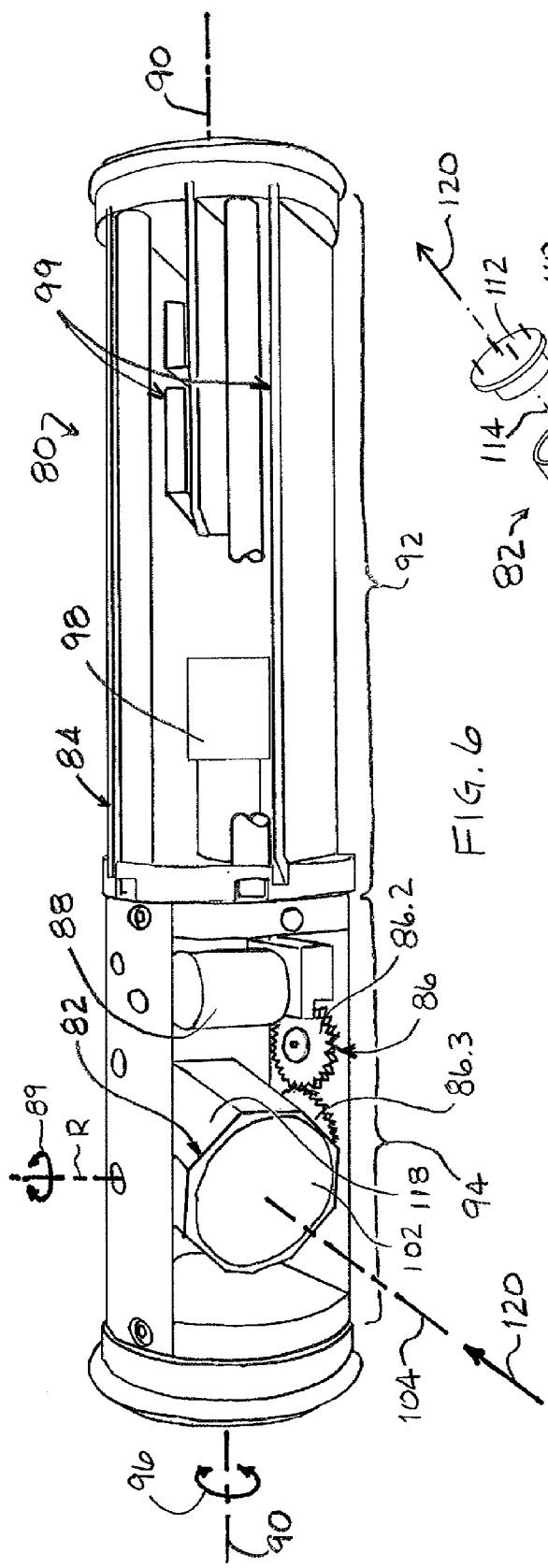

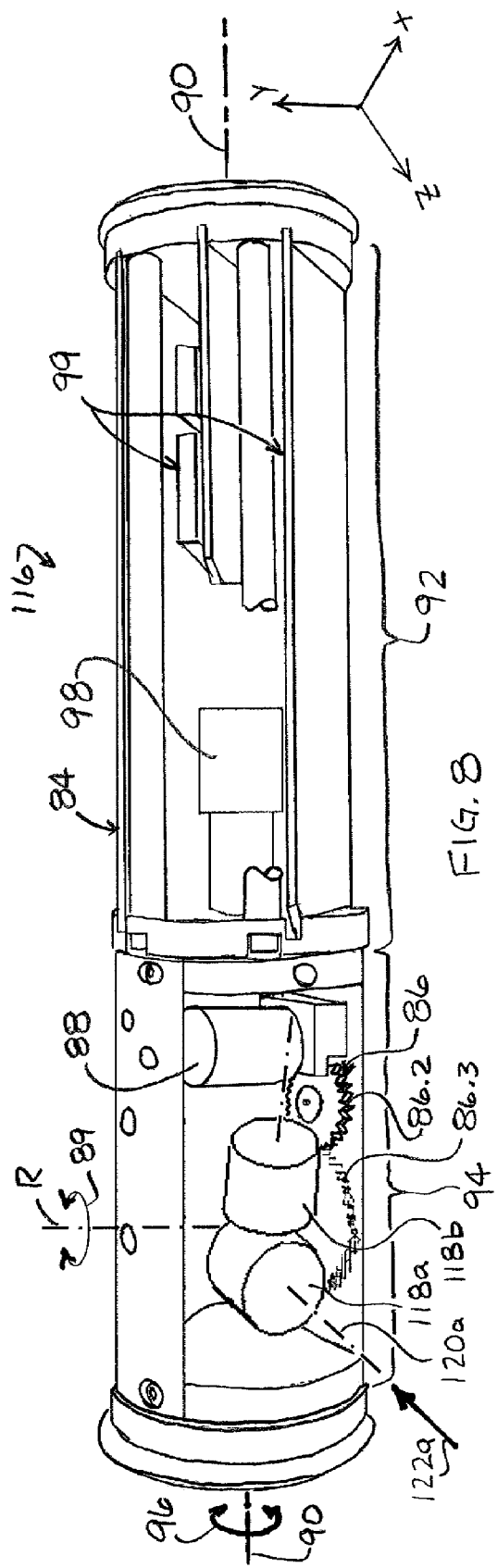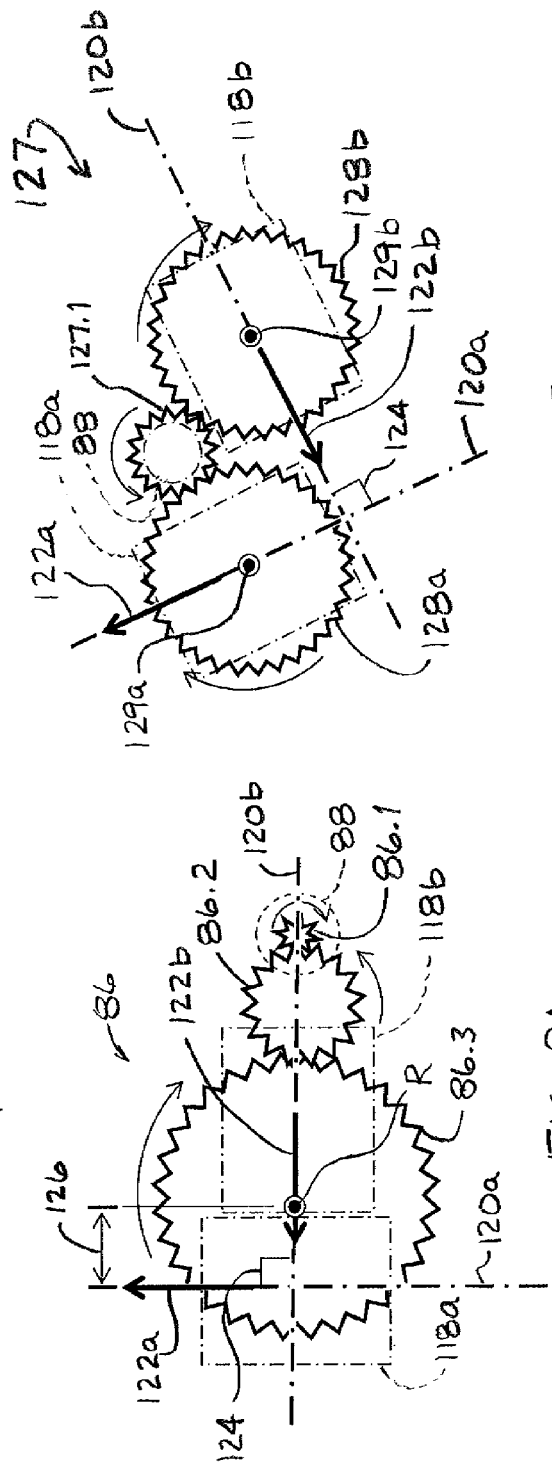

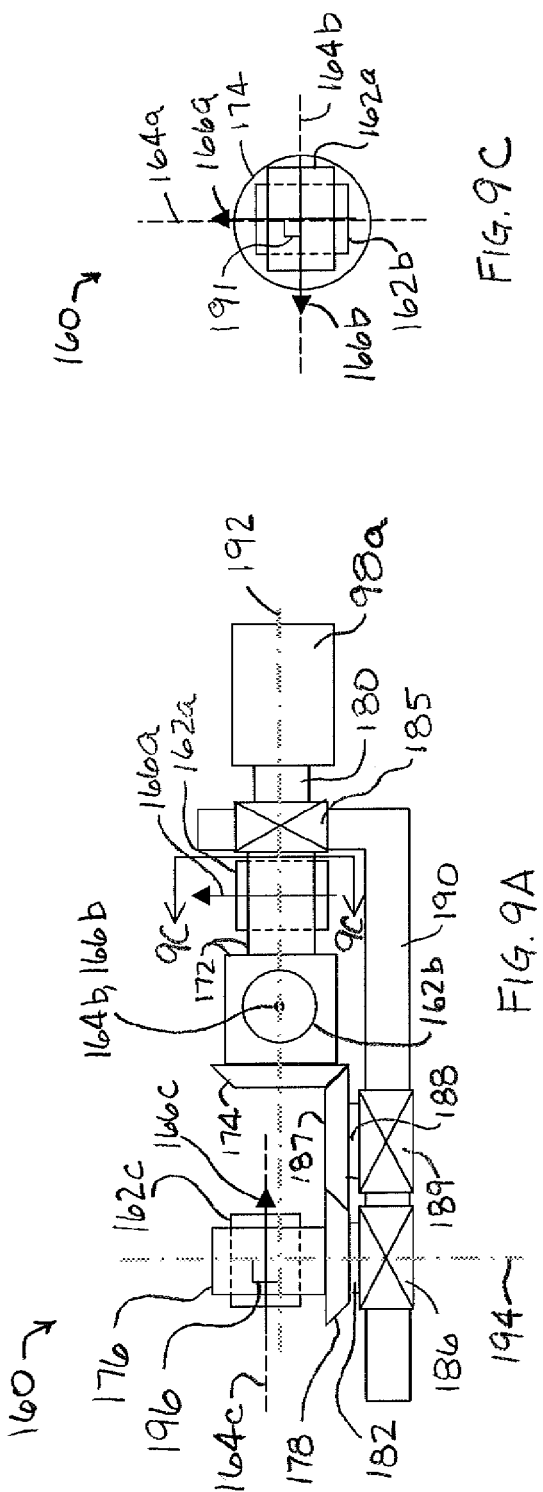
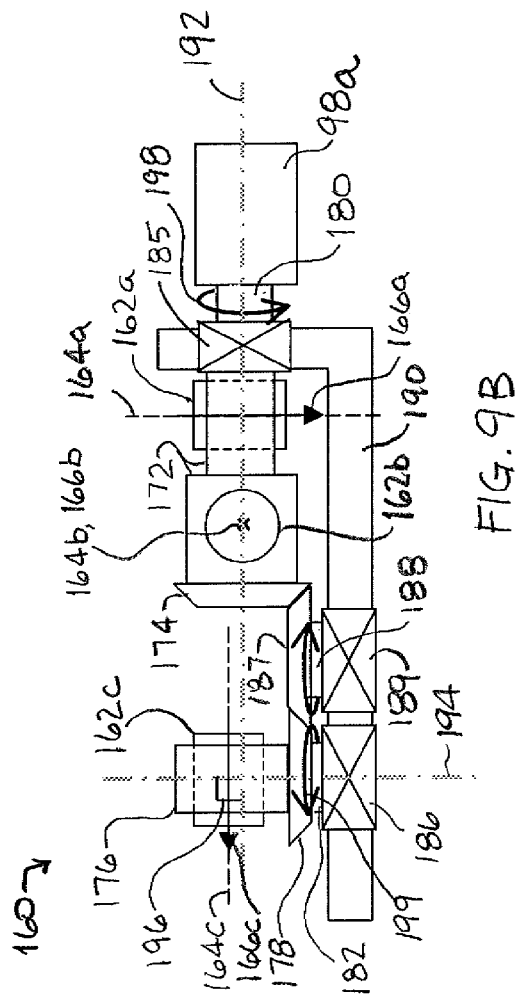

METHOD AND SYSTEM FOR HEADING INDICATION WITH DRIFT COMPENSATION

FIELD OF THE INVENTION

The present disclosure relates generally to devices and methods for determination of heading or bearing, and more particularly to vibrating element gyroscopes used for heading indication relative to true north.

BACKGROUND OF THE INVENTION

The use of gyrocompasses that sense the rotational vector of the earth is known. The advantage of the gyrocompass over traditional magnetic sensing compasses is that the gyrocompass can be used in situations where the magnetic field of the earth is obscured or otherwise disturbed. Example applications for gyrocompasses include an oil well compass (used to sense the absolute orientation of an oil rig borehole for post drilling surveys) and lateral drilling of utility conduits (including but not limited to electrical power lines, data lines, gas lines and water lines, to remote locations such as under a highway or parking lot). In these applications, the course of the borehole or compass may be best provided by a gyrocompass.

Some gyrocompasses utilize a spinning wheel or spinning mass gyroscope coupled with a gimbal support having damping on the gimbals. The rotation of the earth causes precession of the gyro axis and the damping converts these motions into torquing forces that cause the spin axis of the gyro to converge on an axis that is parallel with the earth's spin axis. This convergence process can take on the order of 20 minutes to an hour. Variable damping may also be applied to reduce the time of alignment to approximately 10 minutes. Once aligned, the gyrocompass will maintain alignment with the earth's spin axis while subjected to the dynamic forces associated with movement.

The petroleum industry utilizes the spinning mass directional gyroscope to log or survey boreholes. Procedurally, the spinning mass directional gyroscope is initialized at the top of the borehole, noting its stable relative heading. The gyroscope is lowered down the borehole and readings of relative heading are taken at intervals. Once the directional gyroscope reaches bottom a reading is made and the gyroscope is raised up the borehole and again readings of relative heading are taken at intervals. At the top, a final reading is made.

The difference between the initialized and final readings is attributed to the drift of the gyroscope. Spinning mass gyroscopes have systematic drift caused by earth precession effects, balance imperfections, stray friction, uneven thermal expansion, and the like. The drift is linearly apportioned according to the time of the sample to correct the results of the relative heading. In many situations, the drift is large enough to require many sets of readings to reasonably resolve the drift.

The spinning mass gyroscope has been negatively characterized as being bulky, requiring large amounts of power and having limited useful life (typically from 200 to 1000 hours). Alternative technologies have developed, providing smaller and lighter gyrocompasses that align faster, consume less power, and have longer life cycles. Vibrating element (aka vibrating structure) gyroscopes, a subset of inertial rate gyroscopes, have found favor because of their compactness, ruggedness, low energy consumption and lower cost relative to the spinning mass gyroscope. One example of a gyrocompass utilizing a vibrating element gyroscope is found in U.S. Pat. No. 5,272,922 to Watson (discussed below).

A drawback of the vibrating element gyroscope vis-à-vis the spinning mass gyroscope is the introduction of additional bias and bias drift that make use of current designs for vibrational devices untenable in certain applications. Vibratory gyros have substantially random drift that are often caused primarily by thermal effects. The randomness of the drift can render an assumption of linearity improper.

Consider that the rotation rate of the earth is 15.041 degrees per hour. To resolve the heading orientation to one degree requires rate resolution of 0.263 degrees per hour at the equator. Moreover, the resolution required is proportional to the cosine of the local earth latitude coordinate, thus requiring increased resolution of smaller rates with increasing latitudinal locations. In the oil industry, the heading accuracy requirement varies with the type of well, but generally an uncertainty of 5 degrees is considered acceptable. At a latitude of 45 degrees, for example, such heading accuracy may require a gyroscope that can resolve the rotational vector of the earth to within one degree per hour. The additional bias and bias drift encountered with current designs and utilization methods for vibrating element gyroscopes can substantially exceed these resolution requirements. Accordingly, existing vibrating element gyroscopes have not found application in the context of borehole surveys and other similar applications involving determination of heading orientations where bias and bias drift of the gyroscope are important.

There are certain existing stationary applications (e.g. land surveying) that utilize a ring laser gyroscope to determine heading or orientation. The ring laser gyroscope is used to take single rate readings along two (90°) or more (such as three at 120°) horizontal axis lines. The horizontal component of the earth's spin vector is trigonometrically resolved from the data directly.

Unfortunately, ring laser gyros are quite expensive and lack the ruggedness and compactness generally required for oil field and borehole survey applications as well as other applications. Moreover, ring laser gyroscopes have negligible bias drift. Thus, techniques that utilize ring laser gyroscopes are not instructive in removing or compensating for bias drift in other types of gyroscopes.

An economical apparatus for determining heading orientations that is compact and rugged enough to stand up to the rigors of extreme applications such as mining and oil drilling, along with a method that provides for an ability to compensate for the bias and bias drift effects out would be welcome.

SUMMARY OF THE INVENTION

Various embodiments of the invention provide improved accuracy in a compact and rugged assembly for determination of heading or orientation, such as determination of drilling head location and orientation. The methods and attendant apparatuses disclosed are applied where the assembly is substantially stationary or in equipoise during data acquisition and there is no continuous spinning of the gyroscope. Accordingly, the errors associated with the dynamics of spinning mass gyroscopes (e.g. misalignment of the rotational scanning assembly with respect to true vertical, variation in the rotation rate, wobble of the platform shaft) are eliminated.

With respect to the various bias errors encountered by inertial rate gyroscopes, various embodiments of the invention are directed to methods that mitigates these effects. Samples of averaged data may be taken with the module oriented in alternating directions along or parallel to each of the orthogonal axes. The samples of averaged data may be treated to optimize the rejection of bias and of various drifts in bias. The drift may be linear with respect to time (i.e. a bias subject to a constant rate of change over time), or it may be non-linear (i.e. a rate of change in the bias that varies) during the data acquisition sequence. The processed data for the three axes may be trigonometrically combined to find vertical attitude in bank and elevation and geographic orientation in latitude and heading with respect to true north.

A representative time for an acceptably short data acquisition sequence may be on the order of 5 minutes for many applications. Various embodiments of the invention can adhere to this guideline. In some instances, this guideline can be relaxed because, unlike methods of the prior art, certain embodiments of the invention do not rely on an assumption of linearity of drift with respect to time. Some method embodiments may also correct for slight motion of the assembly if such motion is small relative to the earth's rotational vector.

Various embodiments of the invention include a gyroscope that is compact and rugged and suitable for indication of the heading relative to true north. Certain embodiments utilize both a precision rate gyroscope and an accelerometer. Components of both the earth rotational vector and the earth vertical or gravitational vector may be measured along three orthogonal axes using a mechanism to orient the rate gyroscope and the accelerometer along these axes.

Various embodiments further utilize more than one gyroscope/accelerometer for more rapid acquisition of data. The orientation of the gyroscopes and accelerometers may be orthogonal with respect to each other to resolve the earth's rotational spin and gravity vector in two or three dimensions with simultaneous measurements.

In one embodiment, a method for determining a heading direction is disclosed that includes selecting a gyroscope having a sensitive axis and defining a pointing vector, the gyroscope configured for detection of a rotation rate about the sensitive axis. The gyroscope is oriented in a first orientation such that when the gyroscope is in the first orientation the sensitive axis defines a heading axis and the pointing vector is oriented in a first direction. A first set of indicated rotation rate data is measured with the gyroscope is in the first orientation. The gyroscope may then be oriented in a second orientation with the sensitive axis being substantially parallel to the heading axis, and with the pointing vector being oriented in a second direction substantially opposite the first direction. The gyroscope may also be used to measure a second set of indicated rotation rate data while in the second orientation, the second set of indicated rotation rate data including at least one data point. Orienting the gyroscope in a third orientation with the sensitive axis being substantially parallel to the heading axis and the pointing vector being oriented in substantially the first direction, the gyroscope is then used to measure a third set of indicated rotation rate data while in the third orientation. A corrected rate of rotation of the gyroscope about the heading axis may then be calculated, utilizing at least the first, second and third sets of indicated rotation rate data. Each set of indicated rotation rate data may be acquired while the gyroscope is stationary and includes at least one data point. The method may be extended to include fourth, fifth or sixth sets of rotation rate data obtained, the fourth and sixth sets being acquired with the pointing vector oriented in the second direction and the fifth set of rotation rate data being acquired with the pointing vector oriented in the first direction.

Another method is disclosed for determining a heading direction wherein a gyroscope is oriented in a first orientation with the pointing vector oriented in a first direction, the gyroscope having a sensitive axis and defining a pointing vector, the sensitive axis defining a heading axis. A set of rotational rate signals may be measured from the gyroscope with the gyroscope in the first orientation. The gyroscope may then be oriented in a second orientation, the sensitive axis being substantially parallel to the heading axis, the pointing vector being oriented in a second direction substantially opposite the first direction. Another set of rotational rate signals may be acquired from the gyroscope with the gyroscope in the second orientation. The gyroscope may be alternated between the first orientation and the second orientation and an additional set of rotational rate signals measured from the gyroscope after each alternating to obtain a plurality of sets of signals numbering at least three. A corrected rate of rotation of the gyroscope about the heading axis may be calculated utilizing the plurality of sets of signals. The heading direction may be determined from the corrected rate of rotation. The gyroscope may be substantially stationary during each measuring step.

Another method for determining a heading direction, a bank angle and an elevation angle is disclosed in an embodiment of the invention that includes the following:

(a) selecting a gyroscope having an angular rate sensor and an accelerometer, the angular rate sensor detecting a rotational rate about a first sensitive axis, the accelerometer detecting an acceleration along a second sensitive axis, the first and second sensitive axes having a known spatial relationship;

(b) defining a first orientation of the gyroscope with the first sensitive axis in alignment with a heading axis;

(c) defining a second orientation of the gyroscope with the first sensitive axis parallel with an elevation axis, the elevation axis being at a first projected right angle relative to the heading axis;

(d) defining a third orientation of the gyroscope with the first sensitive axis parallel with a lateral axis, the lateral axis being at a second projected right angle relative to the heading axis, the lateral axis being at a third projected right angle relative to the elevation axis;

(e) measuring a rotational rate data set with the angular rate sensor and a gravitational acceleration data set with the accelerometer, the gyroscope being stationary in the first orientation, each of the data sets including at least one data point;

(f) repeating step (e) with the first sensitive axis oriented parallel to and 180° offset from the first orientation;

(g) alternating between steps (e) and (f) to obtain at least three of the rotational rate data sets and at least three of the gravitational acceleration data sets;

(h) utilizing the rotational rate data sets acquired in steps (e), (f) and (g) to calculate a corrected rate of rotation of the gyroscope about the heading axis;

(i) utilizing the gravitational acceleration data sets acquired in steps (e), (f) and (g) to calculate a corrected gravitational acceleration along the heading axis;

j) repeating steps (e), (f) and (g) for the second orientation;

(k) utilizing the rotational rate data sets acquired in step (j) to calculate a corrected rate of rotation of the gyroscope about the elevation axis;

(l) utilizing the gravitational acceleration data sets acquired in step U) to calculate a corrected gravitational acceleration along the elevation axis;

(m) repeating steps (e) through (g) for the third orientation;

(n) utilizing the rotational rate data sets acquired in step (m) to calculate a corrected rate of rotation of the gyroscope about the lateral axis;

(o) utilizing the gravitational acceleration data sets acquired in step (m) to calculate a corrected gravitational acceleration along the lateral axis;

p) utilizing the corrected gravitational accelerations acquired in steps (l) and (o) to calculate the bank angle;

(p) utilizing the corrected gravitational accelerations acquired in steps (i), (l) and (o) to calculate the elevation angle; and
(q) utilizing the corrected gravitational accelerations acquired in steps (i), (l) and (o) and the corrected rates of rotation acquired in steps (h), (k) and (n) to calculate the heading direction.

The method may also include utilizing the corrected gravitational accelerations acquired in steps (i), (l) and (o) and the corrected rates of rotation acquired in steps (h), (k) and (n) to calculate an earth latitude location of the gyroscope. The known spatial relationship of the gyroscope selected in step (a) may or may not include the first sensitive axis being substantially parallel or concentric with the second sensitive axis.

A general method for correcting a bias error is disclosed in an embodiment of the invention. The method includes:
(a) selecting a sensor having a sensitive axis, the sensor sensing a component vector of a total vector about the sensitive axis, the component vector having a magnitude proportional to a sine or a cosine of an angle between the component vector and the total vector;
(b) orienting the sensor in a first orientation that defines a first direction, the sensitive axis defining a spatial reference axis;
(c) measuring a set of signals from the sensor while the sensor is stationary in the first orientation, the set of signals including at least one signal;
(d) orienting the sensor in a second orientation that defines a second direction, the sensitive axis being substantially parallel with the spatial reference axis, the second direction being substantially opposite the first direction;
(e) repeating step (c) with the sensor in the second orientation;
(f) alternating between the orientations of steps (b) and (d) and performing step (c) after each alternating to obtain a plurality of sets of signals, the plurality of sets of signals numbering at least three; and
(g) calculating a corrected component vector of the sensor about the spatial reference axis utilizing the plurality of sets of signals.

In this general method, the sensor may or may not be a gyroscope and the total vector may or may not be the earth's rotational vector. Also, the spatial reference axis may, but need not be, a heading axis, and the component vector can, but need not be a rate of rotation. The corrected component vector may be corrected rate of rotation.

In some embodiments, devices that may be utilized in carrying out the various methods disclosed may include a gyrocompass system assembly having a framework that supports at least one gyro resonator, each of the at least one gyro resonator defining a sensitive axis for detection of a rotation rate thereabout, the rotation rate being caused by the earth's rotation, the gyroscope being rotatable about an axis of rotation. The axis of rotation and the sensitive axis of the at least one gyro can define a projected angle that is substantially at 90 degrees. At least one motive driver may be included for rotation of the at least one gyro resonator about the axis of rotation. A control system operatively coupled with the at least one motive driver and the at least one gyro resonator for control of and measurement by the gyrocompass system assembly may also be included that responds to a set of programmed instructions for:
orienting a first of the at least one gyro resonator in a first orientation, the sensitive axis of the first gyro resonator defining a heading axis and a first direction;
using the first of the at least one gyro resonator to measure a first set of indicated rotation rate data;
orienting the first of the at least one gyro resonator in a second orientation using the at least one motive driver, the sensitive axis being substantially parallel to the heading axis and being oriented in a second direction substantially opposite the first direction;
using the first of the at least one gyro resonator to measure a second set of indicated rotation rate data while the at least one gyro resonator is in the second orientation;
using the at least on motive driver to return the first of the at least one gyro resonator to the first orientation; and
using the first of the at least one gyro resonator to measure a third set of indicated rotation rate data while the at least one gyro resonator is in the first orientation.

The set of programmed instructions may further include calculating a corrected rate of rotation of the gyrocompass system about the heading axis utilizing at least the first, second and third sets of indicated rotation rate data; determining the heading direction from the corrected rate of rotation; and outputting the heading direction.

In another embodiment, a method for surveying a borehole includes selecting a vibrating element gyroscope configured for insertion into the borehole and inserting the vibrating element gyroscope a distance into the borehole. The gyroscope is caused to become substantially stationary at the distance and is used to obtain a plurality of indicated angular rotation rates while the gyroscope is substantially stationary. The plurality of indicated angular rotation rates are caused by the earth's rotation. The plurality of indicated angular rotation rates are then used to cancel a bias associated with the indicated angular rotation rates to provide a plurality of corrected angular rotation rates. The corrected angular rotation rates are then used to infer a heading direction of the gyroscope.

BRIEF DESCRIPTION OF THE DRAWINGS

FIG. 6 is a perspective view of a combined rate/acceleration sensing gyrocompass in an embodiment of the invention;
FIG. 6A is an isolation view of the gear train for rotating a rate/acceleration sensing module of FIG. 6;
FIG. 7A is an exploded view of a concentrically aligned rate/acceleration sensing module in an embodiment of the invention;
FIG. 7B is an isolated view of a rotation rate sensor and an acceleration sensor in a non-concentrically aligned rate/acceleration sensing module in an embodiment of the invention;
FIG. 8 is a perspective view of a dual axis rate/acceleration sensing gyrocompass in an embodiment of the invention;
FIG. 8A is an isolation view of the gearing arrangement for rotating dual axis rate/acceleration sensing modules utilized in FIG. 8;
FIG. 8B is an isolation view of an alternative gearing arrangement for rotating dual axis rate/acceleration sensing modules in an embodiment of the invention;

FIG. 9A is an elevation view of the triple element rate/acceleration sensing gyrocompass of FIG. 9 in a first orientation in an embodiment of the invention;

FIG. 9B is the elevation view of FIG. 9A with the various rate/acceleration sensors in a second orientation that is 180° offset from the first orientation;

FIG. 9C is a partial sectional view of the triple element rate/acceleration sensing gyrocompass of FIG. 9A;

DETAILED DESCRIPTION OF THE DRAWINGS

Figure 1:
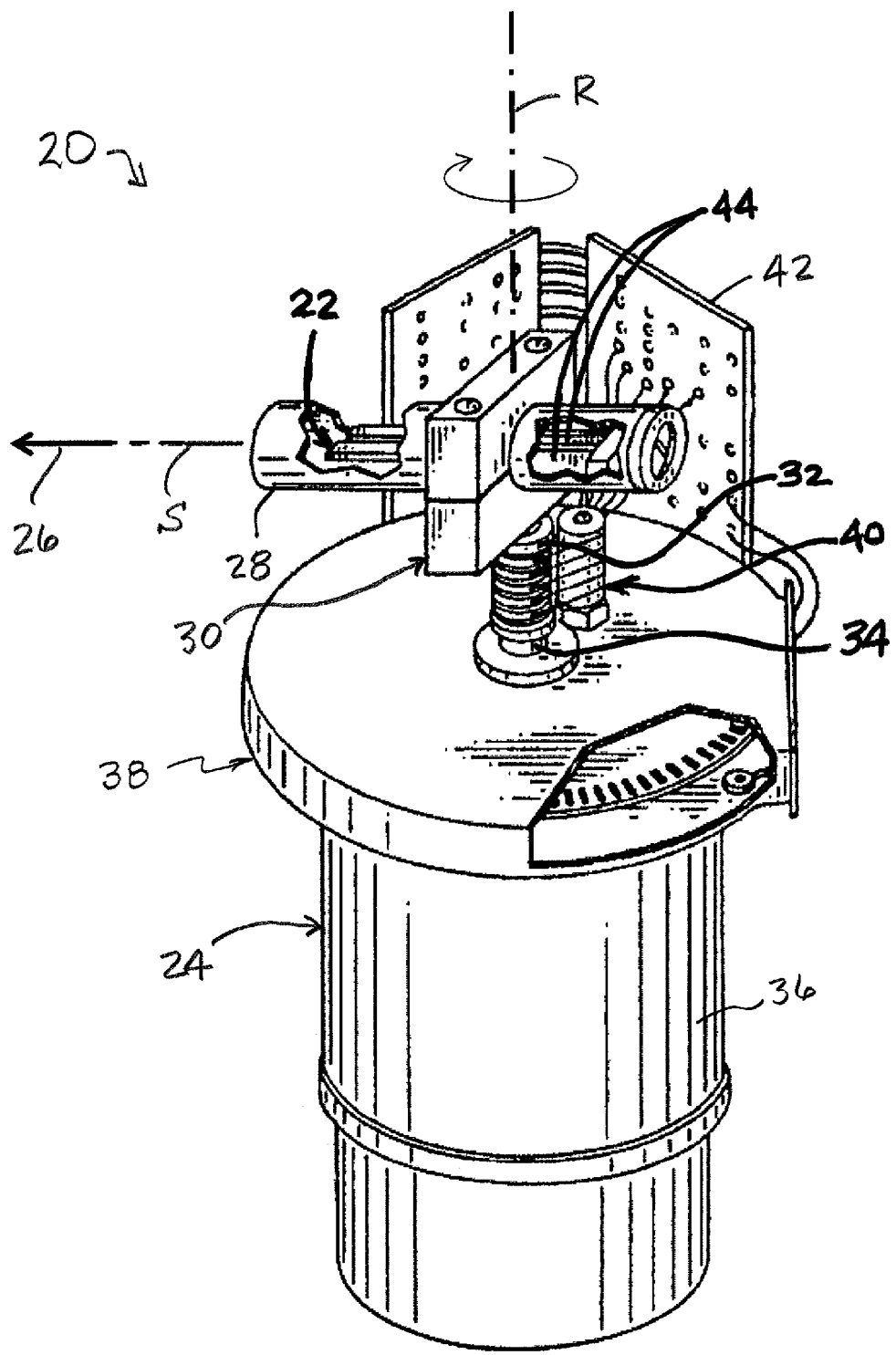
FIG. 1 is a perspective view of a rotating gyrocompass.

Referring to FIG. 1, a north seeking gyroscope or gyrocompass 20 is depicted. In this embodiment, a vibrating element angular rate sensor 22 is mounted on a rotational drive assembly 24 for continuous rotation about an axis of rotation R. The vibrating angular rate sensor 22 may be further characterized by a sensing axis S and a pointing vector 26 that establishes a forward direction of the sensing axis S. The angular rate sensor 22 may be disposed within a housing 28 and held within a clamping structure 30 that establishes a substantially orthogonal relationship between the axis of rotation R and the sensing axis S. The clamping structure 30 may be fixedly connected or attached to the top or distal end 32 of a shaft 34 that extends from a drive motor 36 and through a shaft encoder 38. Electronic coupling means 40 are utilized to transmit the drive signal from a stationary circuit board 42 to the drive elements 44 operatively coupled with the vibrating angular rate sensor 22, and in turn transmit an output or sensing signal from the sensing elements 46 to the stationary circuit board 42.

In operation, the north-seeking gyroscope or gyrocompass 20 senses a heading relative to the rotational vector of the earth by continuously rotating the vibrating element angular rate sensor 22. The gyrocompass 20 is typically oriented and anchored such that the axis of rotation R of the vibrating element angular rate sensor 22 is vertically aligned. Vertical alignment may be established as perpendicular to a leveling measurement or as being parallel with the localized component of the earth's centripetal acceleration vector plus gravitational force vector. The sinusoidal output is synchronized with the alignment to the rotational axis of the earth. The north heading is determined by bandpass filtering and phase detecting of the sinusoidal output. A more detailed description of the inner workings of the gyrocompass 20 are disclosed in U.S. Pat. No. 5,272,922 to Watson, assigned to the assignee of the instant application, the disclosure of which is hereby incorporated by reference other than any express definitions of terms specifically defined therein.

Figure 3:
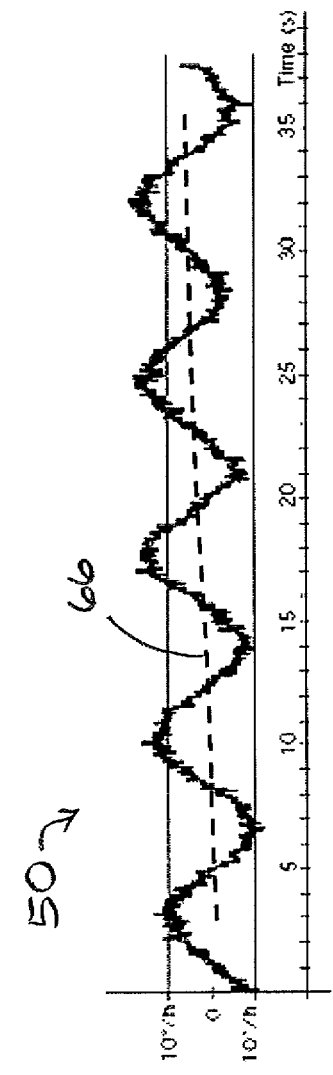
FIG. 3 is a graph of a sinusoidal output generated by the set up of FIG. 2.
Figure 2:
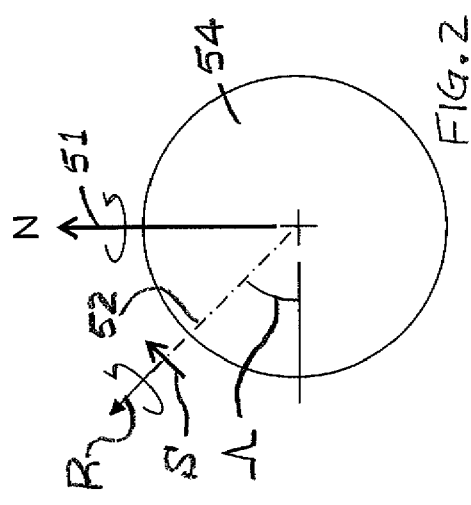
FIG. 2 is a schematic of a set up that rotates the sensitive axis of a gyrocompass about an axis that is parallel to the gravitational pull of the earth.

Referring to FIGS. 2 and 3, continuous rotation of the vibrating element angular rate sensor 22 about the axis of rotation R produces a sinusoidal rotational rate output signal 50 (earth rate sinusoid) with peaks that correspond to the orientation of the sensitive axis S of the angular rate sensor 22 when the sensitive axis S is most closely aligned with the earth's angular rate vector 51 (spin axis or geographic north). The output depicted in FIG. 3 corresponds to the gyrocompass 20 oriented with the sensitive axis S and pointing vector 26 arranged to rotate about a vertical axis 52 that is normal to the earth 54 at a latitude Λ of 45°. North heading may be determined by highly bandpass filtering and phase detecting the sinusoidal output 50. The peak outputs of the sinusoidal output 50 correspond to the equation $$S_M = k \cdot \cos(\Lambda) \qquad \text{Eqn. (1)}$$

where $S_M$ is the peak rotation rate sensed by the vibrating element angular rate sensor 22, the constant k=0.004178 degrees per second or equivalent, and the latitude Λ corresponds to the earth location of the angular rate sensor.

In theory, the only stimuli sensed by the vibrating element angular rate sensor 22 in the arrangement of FIG. 2 is the rotation of the earth 54. In practice, however, the sinusoidal output of the vibrating element angular rate sensor 22 is generally biased due to misalignment with the axis of rotation R. The vibrating element angular rate sensor 22 detects its own rotation rate in proportion to the sine of the misalignment. The bias created by misalignment can be removed by bandpass filtering.

In practice, several factors may corrupt gyrocompass readings that utilize continuously rotating vibratory elements. Variations in the rotation rate may modulate the misalignment that can create time varying biases resulting in additional phase shifts on the filtered signal. The sinusoidal output may have a bias error produced by misalignment of the rotational scanning assembly with respect to true vertical. The bias generated is in proportion to the sine of the misalignment. Such bias in itself can be removed by bandpass filtering. However, any variation in the rotation rate of the gyrocompass modulates the bias error, and these variations generate an additional error on the bandpass filtered signal. Many of these effects are intensified as rotation rates are increased. Additionally, the wobble of the platform shaft due to play in the rotational assembly (e.g. bearing inaccuracies and structure elastic effects) may create additional errors, particularly at higher rotation rates.

Furthermore, vibrating element gyroscopes that are favored because of their compactness may be subject to a drift 66, as illustrated by a central datum in FIG. 3. The drift 66 may be caused by a change in temperature of the vibrating element angular rate sensor 22, particularly with piezoelectric elements which generate a electrical potential in the presence of a changing temperature. Other sources of the drift 66 include secondary effects from flexing and relaxation of the vibrating element of the angular rate sensor 22 during operation.

The additional phase effects caused by rotational rate/mechanism play modulations and bias drift effects do not lend themselves to compensation by bandpass filtering. Hereinafter, such errors, which are unrelated to the vertical alignment of the gyrocompass, are collectively referred to as "non-alignment errors."

Figure 5:
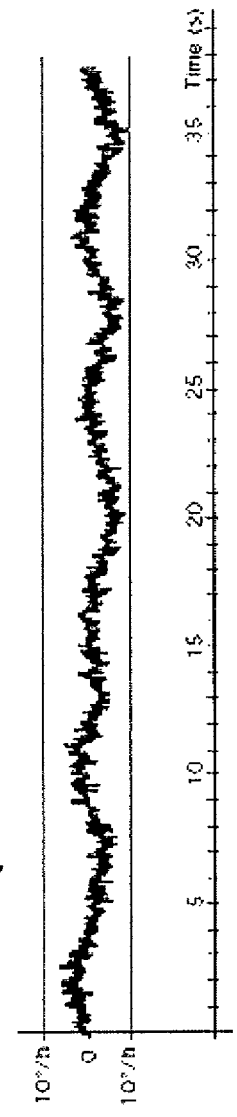
FIG. 5 is a graph of an output generated by the set up of FIG. 4.
Figure 4:
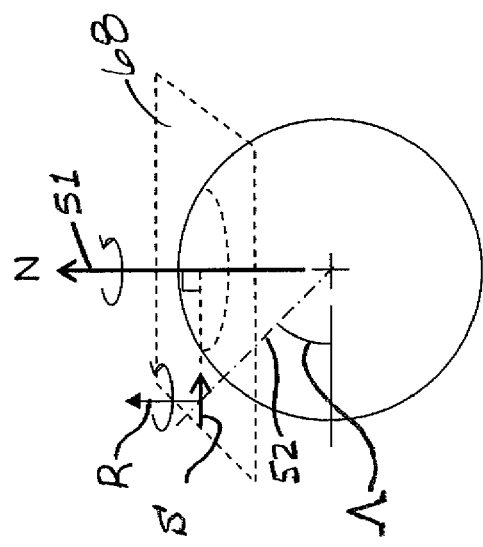
FIG. 4 is a schematic of a set up that rotates the sensitive axis of a gyrocompass about an axis the is parallel to the rotational vector of the earth.

Referring to FIGS. 4 and 5, the effect of biasing errors due to misalignment with true vertical, play and variations in the rotational speed of the rotational assembly 24 is further demonstrated. The vibrating element angular rate sensor 22 was oriented so that the axis of rotation R is parallel with the earth's angular rate vector 51, as depicted in FIG. 4. That is, the gyrocompass is oriented to sweep a plane 68 that is normal to the earth's angular rate vector 51. A corresponding rotational rate output 60 is depicted in FIG. 5. In this orientation, the only stimuli experienced by the vibrating element angular rate sensor 22 is gravitational acceleration, alignment errors and non-alignment errors. In the absence of alignment and non-alignment errors, the output 60 should be constant or non-sinusoidal, as gravity does not impose a rotation about sensitive axis S. However, the output presents an oscillating pattern having a period similar to the sinusoidal output 50.

In certain embodiments of the invention, the solution to the problem of the dynamic non-alignment errors (i.e. those related to rotation of the gyrocompass such as play and speed variations) is to stop the rotation of the vibrating element angular rate sensor 22 while samples of the earth's rotational angular rate vector 51 are acquired. The dynamic non-alignment errors are eliminated in this way, as described below. In addition, the dynamic non-alignment errors may be mitigated through careful mechanical design and fabrication of the equipment.

Referring to FIGS. 6 and 6A, a single element gyrocompass 80 is depicted in an embodiment of the invention. The single element gyrocompass 80 may include a rate/acceleration sensing module 82 mounted to a framework 84 within a housing (removed for clarity). The framework 84 may support a gear train 86 that may be driven by a motive driver 88 such as a stepper motor for rotation of the rate/acceleration sensing module 82 about the axis of rotation R. The gear train 86 may include a driver gear 86.1, an idler gear 86.2 and a driven gear 86.3. The rate/acceleration sensing module 82 may be mounted to the driven gear 86.3 of the gear train 86.

The gear train 86 and motive driver 88 are capable of rotating the rate/acceleration sensing module 82 about the axis of rotation R in either direction and in a rotational range 89 of at least 180°. The driven gear 86.3 may function as a rotating platform for rotation of the rate/acceleration sensing module 82 about the axis of rotation R. An exemplary and non-limiting rotational range is 270°. The gear train 86 may be comprised of anti-backlash gearing.

The framework 84 of FIG. 6 defines a longitudinal axis 90 that is substantially perpendicular to the rotation of axis R. The framework 84 may also be divided into a static or stationary portion 92 and a rotating portion 94 rotatable in either direction of rotation 96 about the longitudinal axis 90 and relative to the stationary portion 92. In this embodiment, the longitudinal axis 90 serves as a second axis of rotation about which the rate/acceleration sensing module 82 is rotated. Rotation of the rotating portion 94 may be driven by a second motive driver 98 that may also be a stepper motor. An exemplary and non-limiting range of the rotation 96 is 90°.

The framework 84 may also support various electronics and integrated circuitry 99 for operation of the instruments and motive drivers. The electronics and integrated circuitry 99 may include a program storage device tangibly embodying a program of instructions, a microprocessor for reading the instructions, and componentry for converting instructions read by the microprocessor into manipulation of the single element gyrocompass 80. Alternatively, the program storage device, microprocessor and componentry may be located remotely (e.g. in a remote computer) instead of within the framework 84.

It will be understood and appreciated that the methods and systems of the various embodiments of the present invention may be programmed as part of one or multiple microprocessors or microcontrollers, or may be implemented as part of an FPGA or custom ASIC circuitry, or any combination thereof, all of which are considered to be non-limiting ways in which the various embodiments of the present invention may be implemented. It will also be understood that while electrically powered motors are depicted and described for use in manipulating the gyroscope, alternative embodiment may use other motive force mechanism. Other such motive drivers include, but are not limited to, encoded motors, cam driven mechanisms, hydraulic or pneumatic rotational acutators, piezoelectric stack elements and thermal actuated mechanisms. The mechanisms may include mechanical stops for repeatable registration at substantially 180° offset.

In some embodiments, one or more gyroscopes having multiple data pick up modes may be used where the multiple pickup modes may be selectively utilized to obtain data corresponding to known and, in some embodiments, orthogonally opposing orientations of a sensing elements on a single gyroscope.

Referring to FIG. 7A, an embodiment of the rate/acceleration sensing module 82 such as could be utilized in the embodiment of FIG. 6 is depicted. A gyro resonator 100 such as a cup resonator having a base portion 102, a vibrating portion 103 and a sensitive axis 104 and including excitation and sensing elements 106, 108 is concentrically aligned with an accelerometer 110 having a base portion 112 and a sensitive axis 114 in substantial alignment with the sensitive axis 104 of the gyro resonator 100. A pointing vector 120 may be arbitrarily chosen as being aligned with the sensitive axis 104 in a direction that passes first through the base portion 102 and then through the vibrating portion 103 of the gyro resonator 100. That is, the pointing vector 120 establishes which direction along the sensitive axis 104 the gyro resonator 100 is pointed. The gyro resonator 100 and accelerometer 110 may be separated by a spacer ring 118. The accelerometer 110 may cooperate with the gyro resonator 100 for compactness. For example, the accelerometer 110 may be dimensioned to extend into the inner diameter of a cup resonator such as depicted in FIG. 7A.

The spacer ring 118 may be fabricated from a suitable material such as brass for ease of soldering with the base portions 102 and 112. The framework 84 and housing may be constructed of a material having a low coefficient of thermal expansion and a relatively low thermal conductivity, such as stainless steel, to limit the effects of temperature change on the structure.

In operation, the motive driver 88 may be utilized to position rate/acceleration sensing module 82 at an arbitrary rotational position about the axis of rotation R within the rotational range 89. The second motive driver 98 likewise may be utilized to position the rotating portion 94 at an arbitrary rotational position about the longitudinal axis 90 within the rotational range 96. If the motive drivers 88 or 98 are stepper motors, the motor itself may adequately hold the rate/acceleration sensing module 82 in a static position. If anti-backlash gearing is utilized, the stability and repeatability of the rotational position may be within ±0.1°.

Referring to FIG. 7B, an alternative arrangement of the gyro resonator 100 and accelerometer 110 is depicted in an embodiment of the invention. The embodiments represented by FIGS. 6 and 7A include the sensing axis 114 of the accelerometer 110 in substantial alignment with the sensitive axis 104 of the gyro resonator 100. The invention is not limited to this configuration. Axes 104 and 114 may be in any arbitrary relationship with respect to each other, such as portrayed in FIG. 7B. (For clarity, FIG. 7B does not include a housing or spacer structure.) The arbitrary relationship may include a known projected angle 119 between the sensing axis 114 of the accelerometer 110 and the sensitive axis 104 of the gyro resonator 100. An example of how an arbitrary relationship is utilized is presented attendant the discussion of FIGS. 17A through 17C.

By "projected" angle 119, it is understood that the axes 104 and 114 may, but need not intersect each other in three-dimensional space. That is, the sensitive axis 104 may pass over or under the sensing axis 114 and still have the characteristic projection. Thus, the projected angle 119 is defined from a view point that is normal to both axes 104 and 114.

Referring to FIGS. 8 and 8A, a dual element gyrocompass 116 is depicted in an embodiment of the invention. The dual element gyrocompass 116 may comprise some of the same components as the single element gyrocompass 80. For example, the dual element gyrocompass may include the gear train 86, the motive drivers 88 and 98 and the framework 84 including stationary and rotating portions 92 and 94 that define the longitudinal axis 90. The gear train 86 may also comprise the same components as the single element gyrocompass 80, such as the driver gear 86.1 and the idler gear 86.2 that rotate the driven gear 86.3 about the axis of rotation R.

In the depiction of FIGS. 8 and 8A, the dual element gyrocompass 116 further includes two rate/acceleration sensing modules 118a and 118b, each defining a sensitive axis 120a and 120b, respectively. A pair of pointing vectors 122a and 122b may be defined as in alignment with the sensitive axes 120a and 120b, respectively, and pointing in a given direction relative to the orientation of the rate/acceleration sensing modules 118a and 118b, respectively. The rate/acceleration sensing modules 118a, 118b may be operatively coupled with the driven gear 86.3 for rotation about the axis of rotation R. (The rate/acceleration sensing modules 118a, 118b are shown in perspective in FIG. 8 and in phantom in FIG. 8A.)

The embodiment illustrated in FIGS. 8 and 8A portray the rate/acceleration sensing modules 118a and 118b in an arrangement wherein the axes 120a and 120b define a projected right angle 124 with respect to each other. As with the projected angle 119 discussed above, the projected right angle 124 does not require an intersection of the axes 120a and 120b in three-dimensional space.

It is further noted that FIGS. 8 and 8A portray an embodiment wherein the axis of rotation R does not intersect one of the sensitive axes. Specifically, a lateral offset 126 is defined between the sensitive axis 120a and the axis of rotation R. Accordingly, the sensitive axes of the various embodiments need not intersect in three-dimensional space.

Referring to FIG. 8B, an alternative gear train 127 for rotating the two rate/acceleration sensing modules 118a and 118b is depicted in an embodiment of the invention. The gear train 127 includes a driver gear 127.1 operatively coupled with a pair of driven gears 128a and 128b. Each of the driven gears 128a and 128b rotates about its own axes of rotation 129a and 129b, respectively. The driven gears 128a and 128b may be substantially identical. An idler gear (not depicted) operatively coupled between the driver gear 127.1 and the driven gears 128a, 128b may be included in the gear train 127.

In assembly, the rate/acceleration sensing modules 118a, 118b are oriented so that the sensitive axes 120a and 120b project the right angle 124 with respect to each other.

Functionally, where the driven gears 128a and 128b are substantially identical, gears 128a and 128b are rotated an equal amount for a given rotation of the driver gear 127.1. In this embodiment, the relationship between the sensitive axes 120a and 120b will maintain the substantially right angle projection 124 at all rotational positions. The gear train 127 may also occupy a narrower width dimension 129 than the gear train 86 of FIG. 8A for rate/acceleration modules of equal size. The idler gear (not depicted) may cause the driver gear 127.1 and the driver gears 128a and 128b to rotate in the same direction.

The dual sensor configurations of FIGS. 8, 8A and 8B enable simultaneous measurement of the rotation rate about sensitive axes 120a and 120b, depicted as being in parallel with an x-axis and a z-axis of an arbitrary Cartesian coordinate system (FIG. 8). The rotating portion 94 is still rotated 90° about the longitudinal axis 90 for measurement of rotation rate about the third axis (depicted as the y-axis in FIG. 8). Thus, the dual sensor configurations of FIGS. 8, 8A and 8B may produce a full data set in three dimensions in two-thirds the time of a single sensor system.

Referring to FIGS. 9A, 9B and 9C, a triple element gyrocompass 160 is depicted in an embodiment of the invention. The triple element gyrocompass 160 can include a trio of rotational rate sensors 162a, 162b and 162c, each having a sensitive axis 164a, 164b and 164c, respectively. A trio of pointing vectors 166a, 166b and 166c can be defined as in alignment with the sensitive axes 164a, 164b and 164c, respectively, as depicted. Each of the rotational rate sensors 162a, 162b and 162c may comprise the rate/acceleration sensing module 82, or some other rotational rate sensor available to the artisan.

In one embodiment, two of the rotational rate sensors 162a and 162b are supported by a first sensor mount 172 that is operatively coupled to a first bevel gear 174. The third rotational rate sensor 162c may be supported by a second sensor mount 176 that is operatively coupled to a second bevel gear 178. Each of the first and second bevel gears 174, 178 may be supported by a first shaft 180 and a second shaft 182, respectively, each being operatively coupled with a first and second bearing 185 and 186, respectively. An idler bevel gear 187 may be disposed between the first bevel gear 174 and the second bevel gear 178, the idler bevel gear being supported by an idler shaft 188 operatively coupled with an idler bearing 189. The bearings 185, 186 and 189 may be mounted to a common chassis 190.

The common chassis 190 and components operatively coupled thereto may be sized for installation within the framework 84 and arranged so a single drive motivator 98a akin to the second drive motivator 98 of the embodiment of FIGS. 6 and 8 is operatively coupled to the first shaft 180. The first, second and idler bevel gears 174, 178 and 187 can be comprised of anti-backlash gearing and sized to provide a 1:1 gearing ratio.

The first sensor mount 172 can be configured to maintain the sensitive axes 164a and 164b at a substantially right angle projection 191 with respect to each other (FIG. 9C) and on planes that are substantially parallel to each other. The second sensor mount 176 may also be oriented so that the sensitive axis 164c is on a plane that is substantially parallel to the sensitive axis 164b. The first and second shafts 180 and 182 may define first and second axes of rotation 192 and 194, respectively, that define a right angle projection 196 with respect to each other.

In operation, the single drive motivator 98a can be configured to rotate the first shaft 180 by 180°, as depicted by the rotational arrow 198 (FIG. 9B). In this embodiment, the rotation displaces the sensitive axes 164a and 164b of the rotational rate sensors 162a and 162b by 180°. Where there is a 1:1 gear ratio between bevel gears 174, 178 and 187, the rotation of the first shaft 180 may cause a substantially equal rotation of the second bevel gear 178 (depicted by the rotational arrow 199) and a 180° rotational displacement of the rotational rate sensor 162c and the associated sensitive axis 164c. By this configuration, all three sensitive axes 164a, 164b and 164c are offset by 180° simultaneously by activation of the single drive motivator 98a. Accordingly, the configuration of FIGS. 9A, 9B and 9C may negate the need for the first drive motivator 88 of FIGS. 6 and 8 as well as the need for the rotating portion 94 that rotates relative to the stationary portion 92. The simultaneous measurement along three substantially orthogonal axes may speed up the data acquisition sequence, thus reducing the time required to resolve the heading reading.

The idler components (i.e. the idler bevel gear 187 and associated idler shaft 188 and idler bearing 189) enable the chassis 190 to occupy a narrower footprint. The idler components may be eliminated and the first bevel gear 174 arranged to drive the second bevel gear 178 directly. However, without the idler bevel gear 187, the diameter of the first and second bevel gears 174 and 178 may have to be made larger to enable the rotational rate sensor 162c to rotate about the second axis of rotation 194 without interference from the first bevel gear 174. That is, the width of the chassis 190 (dimension into the plane of FIGS. 9A and 9B) may be narrower because the bevel gears 174, 178 and 187 can be of smaller diameter than in a configuration without the idler bevel gear 187.

Figure 10:
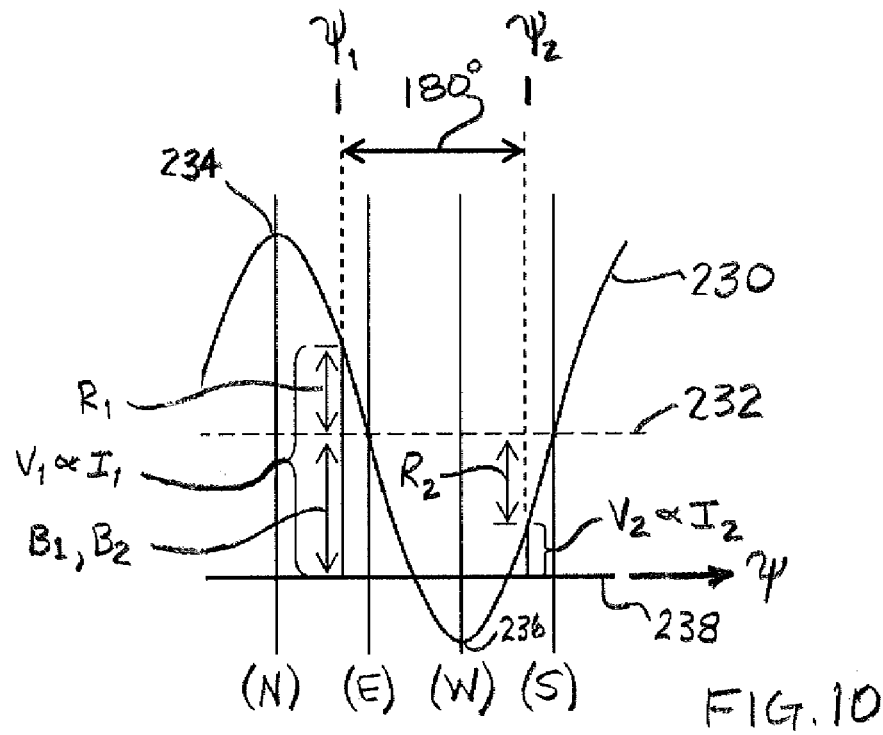
FIG. 10 is a depiction of the components of measurement in an embodiment of the invention.

Referring to FIG. 10, a basis of a multiple data set method of determining a heading ψ is illustrated according to an embodiment of the invention. As applied herein, the term "heading" refers to an angle as measured relative to true north. The figure portrays an output signal 230 of a rate gyroscope such as the gyro resonator 100 contained in the single element gyrocompass 80 as a function of the heading ψ. In this particular embodiment, the signal 230 is at a maximum 234 when the sensitive axis 104 and the earth's rotational axis 51 (FIGS. 2 and 4) lies on the same plane and with the pointing vector 120 pointing in a northern orientation (N). Correspondingly, the signal 230 for such an embodiment would be at a minimum 236 when the sensitive axis 104 and the earth's rotational axis 51 lie on the same plane and the pointing vector 120 pointing in a southern orientation (S).

The output signal 230 is sinusoidal in nature, defining a central abscissa 232 equidistant between the minimum 236 and maximum 234. As depicted, the output signal 230 at any point along the central abscissa 232 is comprised of two components: a rate component (e.g. $R_1$ or $R_2$) as referenced from the central abscissa 232, and a bias component (e.g. $B_1$ or $B_2$) as referenced between a signal abscissa 238 and the central abscissa 232.

The output signal 230 intersects the central abscissa 232 at the east (E) and the west (W) headings. Accordingly, the rate component R is zero when the heading ψ is aligned in the east (E) or west (W) direction. In the east or west orientation, the sensitive axis 104 of the gyro resonator 100 is on a plane that is orthogonal with the earth's angular rate vector 51 (FIGS. 2 and 4), and the gyroscope senses no angular rotation due to the rotation of the earth.

Procedurally, the method based on the FIG. 10 depiction involves measuring a first signal $V_1$ with the sensitive axis 104 of the rate gyroscope oriented at a first heading $\psi_1$ of unknown orientation, and a second signal $V_2$ with the pointing vector 120 (e.g. FIG. 6) oriented at a second heading $\psi_2$, wherein headings $\psi_1$ and $\psi_2$ are offset 180° from each other. For clarity, headings $\psi_1$ and $\psi_2$ need not be coincident along a common axis; rather, headings $\psi_1$ and $\psi_2$ need only be parallel to each other in three-dimensional space to accomplish the methodology. For example, for the dual axis gyrocompass 116 of FIG. 8A, a 180° rotation of the driven gear 86.3 may align the sensitive axis 120a to provide the second heading $\psi_2$ parallel to the first heading $\psi_1$, but the headings $\psi_1$ and $\psi_2$ would not coincident along a common axis because of the lateral offset 126.

Nor does an offset of 180° require the rate gyroscope to be rotated 180° about a particular axis; it is understood that any sequence that results in the rate gyroscope facing in an opposite but parallel direction is anticipated by the various embodiments of the invention.

The signals $V_1$ and $V_2$ may be represented by a time averaged value of several data points for statistical treatment. The signals $V_1$ and $V_2$ are related to the bias and rate components as follows:

$$V_1 \cdot \kappa_1 = I_1 = B_1 + R_1 \qquad \text{Eqn. (2)}$$

$$V_2 \cdot \kappa_2 = I_2 = B_2 + R_2 \qquad \text{Eqn. (3)}$$

where $I_1$ and $I_2$ are the indicated or uncorrected rotation rates sensed at headings $\psi_1$ and $\psi_2$ respectively, $B_1$ and $B_2$ are the bias components of the indicated rotation rates $I_1$ and $I_2$ during the measurements of $V_1$ and $V_2$ respectively, $R_1$ and $R_2$ are the rotational rate components of the indicated rotation rates $I_1$ and $I_2$, and $\kappa_1$ and $\kappa_2$ are scale factors for converting the signals $V_1$ and $V_2$ to the indicated rotation rates $I_1$ and $I_2$.

If headings $\psi_1$ and $\psi_2$ are obtained from a common device, the scale factors $\kappa_1$ and $\kappa_2$ are equal and may be cancelled ratiometrically. If separate sensors are used, the scale factors $\kappa_1$ and $\kappa_2$ may have to be equalized or otherwise compensated for to optimize the heading accuracy in combining separate sensor data.

The metric for signals $V_1$ and $V_2$ may be any signal that is received from the rate gyroscope, including but not limited to voltages, currents, capacitances, frequencies, or other outputs from gyroscopes available to the artisan. The biases $B_i$, rotation rates $R_i$ and indicated rotation rates $I_i$ have units of angular displacement per unit time (e.g. degrees per hour).

If the bias B is constant over the course of the $V_1$ and $V_2$ measurements, then $B_1 = B_2$. Moreover, for headings $\psi_1$ and $\psi_2$ that are offset by 180°, and the magnitude of the sensed rotational rates $R_1$ and $R_2$ will be of equal magnitude but of opposite polarity with respect to the central abscissa 232. That is, $R_2 = -R_1$ relative to the central abscissa 232 for offsets of 180°. Substituting $B_1$ for $B_2$ and $-R_1$ for $R_2$ and subtracting $I_1$ from $I_2$ cancels the bias terms and gives a result that is twice the rotation rate:

$$I_1 - I_2 = (B_1 + R_1) - (B_1 - R_1) = 2 \cdot Q_{1\text{-}2} \qquad \text{Eqn. (4)}$$

where $Q_{1\text{-}2}$ is a two-set corrected rotation rate (that is, a corrected rotation rate based on two data sets) sensed at heading $\psi_1$. The two-set corrected rotation rate $Q_{1\text{-}2}$ may then be utilized to provide the value of the heading $\psi_1$:

$$\psi_1 = \sin^{-1}(Q_{1\text{-}2}/Q_N) \qquad \text{Eqn. (5)}$$

where $Q_N$ is the measured rotation rate when the single element gyrocompass 80 is oriented at true north and the heading $\psi_1$ is expressed relative to a true north heading.

Figure 11:
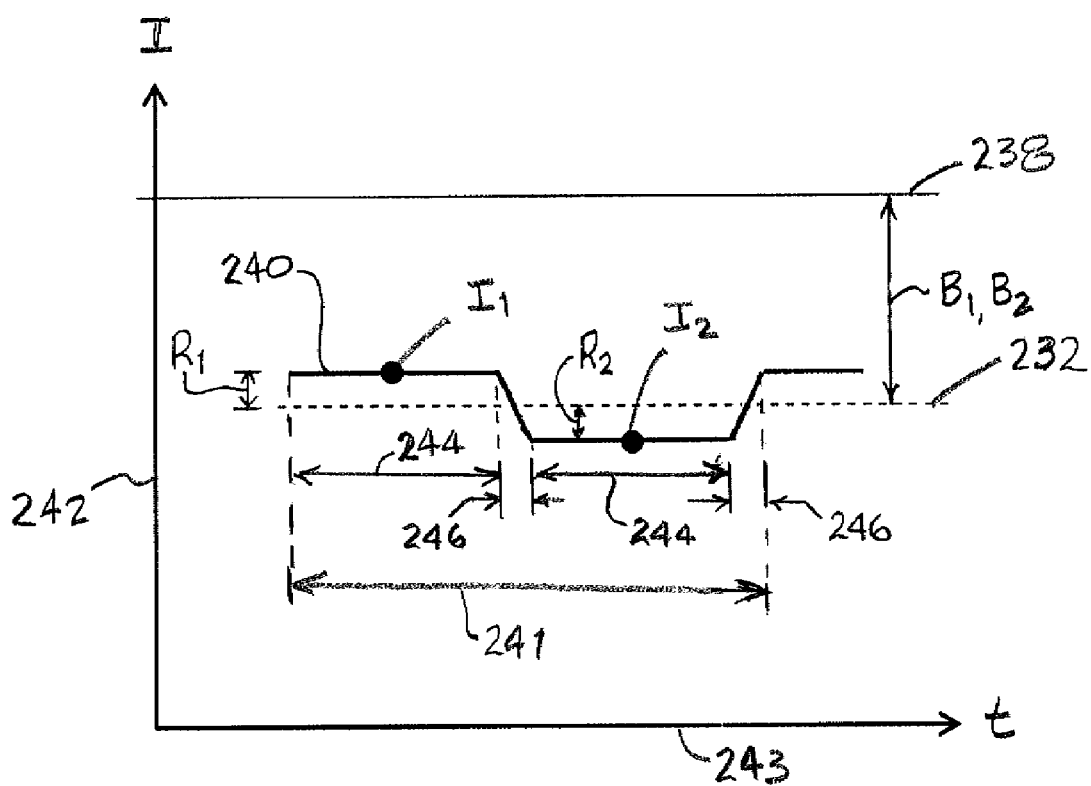
FIG. 11 is a depiction of the measurement of the measurement components of FIG. 9 in the time domain.

Referring to FIG. 11, the two-set method is depicted in the time domain in an embodiment of the invention. An output 240 of the indicated rotation rate I spanning a data acquisition sequence 241 is plotted on the ordinate 242 versus time t on the abscissa 243 and is displaced from the signal abscissa 238. A sampling method or system may be utilized wherein the sampling populations that comprise the indicated rotation rates $I_1$ and $I_2$ are weighted and acquired over sampling time intervals 244 that are equal. Transition time intervals 246 between the weighted sampling intervals may also be utilized. The central abscissa 232 may be inferred from the average of the indicated rotation rates $I_1$ and $I_2$. Just as in the FIG. 10 depiction, the rotation rates $R_1$ and $R_2$ are referenced from the central abscissa 232 and the bias components $B_1$ and $B_2$ are referenced between the central and signal abscissas 232, 238.

The two-set method is valid when the bias is substantially constant. If the bias B is not constant, the variation between acquisition of indicated rotation rates $I_1$ and $I_2$ may lead to errors in the corrected rotation rate $Q_{1-2}$ using the two-set method.

Figure 12:
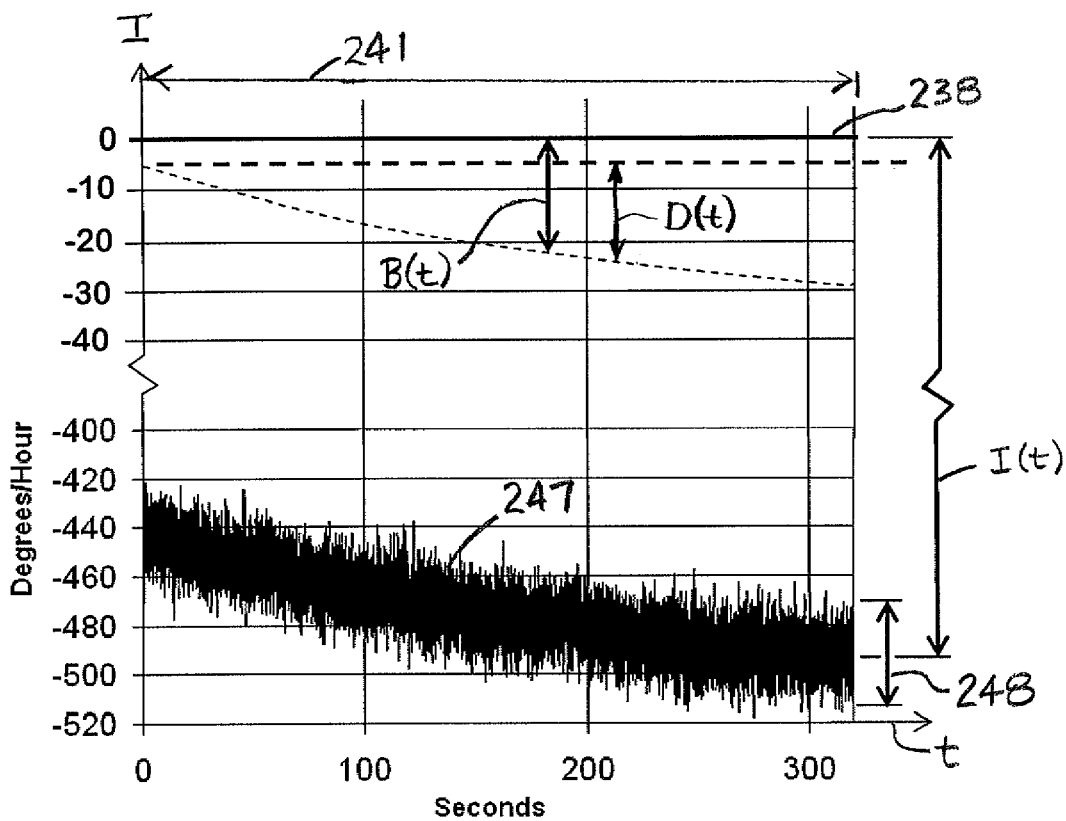
FIG. 12 is a graph of a representative output of a stationary rate gyroscope over a fixed time period.

Referring to FIG. 12, an output signal 247 having a substantial and time varying bias drift D(t) during the data acquisition sequence 241 is depicted. The time varying aspect of the bias drift D(t) creates a time-dependent bias B(t). The bias drift D(t) may be caused by transient effects such as changes in temperature or secondary effects caused by flexure of the resonator. The data 247 of FIG. 12 was taken with the gyroscope dwelling at a single heading ψ for a period of time representative of a data acquisition sequence 241 to illustrate the effect of bias drift D(t).

The FIG. 12 data also illustrates a scenario where the intrinsic noise 248 of the data 247 is substantial relative to the magnitude of the bias B(t) and bias drift D(t). Averaging the data over time can reduce the uncertainty of the measurement.

Furthermore, using the same gyroscope for all measurements over a limited time interval limits the scale factor variations. Embodiments where the data is utilized ratiometrically may further mitigate scale factor variations.

Figure 13:
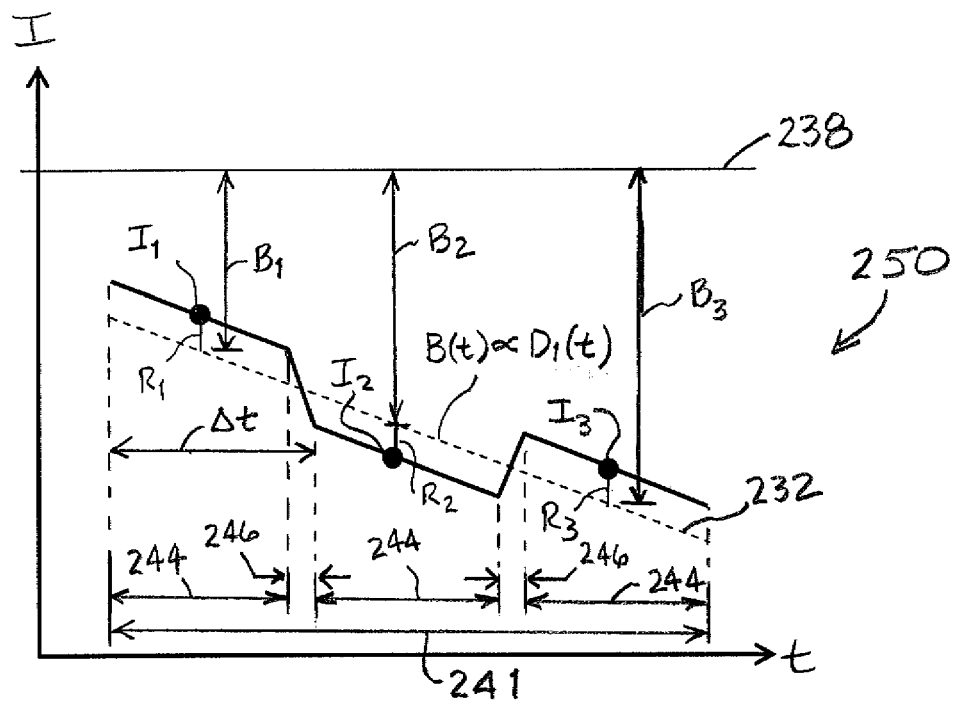
FIG. 13 is a time domain depiction of a measurement of a rate gyroscope having a constant drift component in an embodiment of the invention.

Referring to FIG. 13, a time domain output 250 is depicted for mitigating the effects of non-dynamic biases (e.g. temperature effects) is explained in an embodiment of the invention. A three-set method (that is, a method based on three data sets) of determining a heading ψ wherein the bias B(t) is not constant but is characterized by a constant or linear bias drift $D_1$ is depicted. Acquiring three indicated rotation rates $I_1$ $I_2$ and $I_3$ enables the linear bias drift $D_1$ to be detected and compensated.

For a constant or linear bias drift $D_1$ across the acquisition interval 241, the average of the indicated rotation rates $I_1$ and $I_3$ would have the same bias as the rotation rate $I_2$. That is, $B_2=(B_1+B_3)/2$. Using substitutions previously discussed, the following equations are derived:

$$I_1 = R_1 + B_1 \quad \text{Eqn. (6)}$$

$$I_2 = R_2 + B_2 = -R_1 + (B_1 + \Delta t \cdot \delta B) \quad \text{Eqn. (7)}$$

$$I_3 = R_3 + B_3 = -R_1 + (B_1 + 2 \cdot \Delta t \cdot \delta B) \quad \text{Eqn. (8)}$$

where δB is the rate of change of the bias and Δt is the time interval from the start of one sample interval to the start of the next. Accordingly:

$$(I_1+I_3)/2 = (2 \cdot R_1 + 2 \cdot B_1 + 2 \cdot \Delta t \cdot \delta B)/2 = R_1 + B_1 + \Delta t \cdot \delta B \quad \text{Eqn. (9)}$$

$$Q_{1-3} = ((I_1+I_3)/2 - I_1)/2 = I_1/4 - I_2/2 + I_3/4 = (Q_{1-2} - Q_{2-3})/2 \quad \text{Eqn. (10)}$$

where $Q_{1-3}$ is a three-set corrected rotation rate and $Q_{1-2}$ and $Q_{2-3}$ are the two-set corrected rotation rates based on the indicated rotation rates $I_1$ and $I_2$ and the indicated rotation rates $I_2$ and $I_3$, respectively. The value of $Q_{1-3}$ may then be entered into Eqn. (5) for determination of the heading ψ.

The three-set method of FIG. 13 may be valid in situations where there is a linear bias drift $D_1$. However, as FIG. 12 illustrates, the bias drift D may be non-linear. If the bias drift D is not constant, the slope of the variation between acquisition of indicated rotation rates $I_1$, $I_2$ and $I_3$ may lead to errors in the corrected rotation rate $Q_{1-3}$ using the three-set method.

Figure 14:
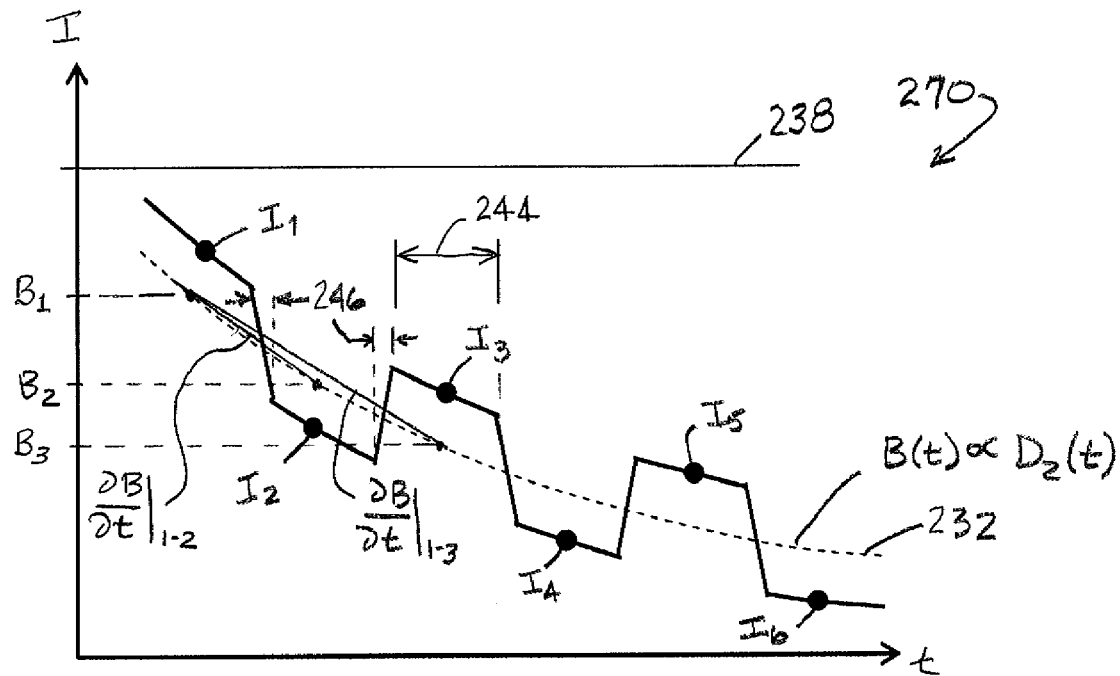
FIG. 14 is a time domain depiction of a measurement of a rate gyroscope having a varying drift component for various embodiments of the invention.

Referring to FIG. 14, a time domain output 270 is depicted for four-, five- and six-set methods of determining a heading ψ having a non-linear bias drift $D_2$ that may be corrected in an embodiment of the invention. Acquiring indicated rotation rates $I_1$ through $I_n$, where n is greater than three, may enable the non-linear drift $D_2$ to be adequately characterized and compensated.

The non-linear bias drift $D_2$ may be characterized by a series of higher order derivatives. For example, the trend of the non-linear bias drift $D_2$ may be characterized as having a second derivative of the bias with respect to time $\partial^2 B/\partial t^2$ that is substantially constant across the acquisition interval 241.

For a substantially constant second derivative, and where the sampling method or system comprises sampling time intervals 244 that are equal and transition time intervals 246 that are equal, the differences in the slope $\partial B/\partial t$ of the biases measured biases $B_i$ (i.e. $\partial^2 B/\partial t^2$ across contiguous acquisition intervals) are twice as much between indicated rotation rates $I_1$ and $I_3$ as it is between indicated rotation rates $I_1$ and $I_2$. Accordingly, a four-set corrected rotation rate $Q_{1-4}$ may be expressed in terms of a series of two-set corrected rotation rates $Q_{1-2}$, $Q_{2-3}$ and $Q_{3-4}$:

$$\begin{aligned} Q_{1-4} &= ((Q_{1-2} + Q_{3-4})/2 - Q_{2-3})/2 \quad \text{Eqn. (11)} \\ &= Q_{1-2}/4 - 2 \cdot Q_{2-3}/4 + Q_{3-4}/4 \\ &= ((I_1 - I_2)/2 - 2 \cdot (I_2 - I_3)/2 + (I_3 - I_4)/2)/4 \\ &= 1/8 \, [I_1 - 3 \cdot I_2 + 3 \cdot I_3 - I_4] \end{aligned}$$

The four-set corrected rotation rate $Q_{1-4}$ may also be expressed in terms of three-set corrected rotation rates $Q_{1-3}$ and $Q_{2-4}$. Where the second derivative $\partial^2 B/\partial t^2$ is constant, the three-set corrected rotation rate $Q_{1-3}$ has same error from the bias drift $D_2$ as the three-set corrected rotation rate $Q_{2-4}$, but opposite rate signal. Thus, subtracting one from the other cancels the error in the corrected rotation indication while providing an indication of the rotation rate:

$$\begin{aligned} Q_{1-4} &= (Q_{1-3} - Q_{2-4})/2 \quad \text{Eqn. (12)} \\ &= \left( \begin{array}{c} (I_1/4 - 2 \cdot I_2/4 + I_3/4) - \\ (I_2/4 - 2 \cdot I_3/4 + I_4/4) \end{array} \right) \Big/ 2 \\ &= 1/8 \, [I_1 - 3 \cdot I_2 + 3 \cdot I_3 - I_4] \end{aligned}$$

Higher orders of correction simply build on the concept of cancellation of equal errors created by the correction of immediately previous order. For example, a five-set corrected rotation rate $Q_{1-5}$ may be implemented where a constant third derivative $\partial^3 B/\partial t^3$ is present, derived as follows:

$$Q_{1-5} = (Q_{1-4} - Q_{2-5})/2 \quad \text{Eqn. (13)}$$

$$= \left( \begin{array}{c} (I_1/8 - 3*I_2/8 + 3*I_3/8 - I_4/8) - \\ (I_2/8 - 3*I_3/8 + 3*I_4/8 - I_5/8) \end{array} \right) / 2$$

$$= 1/16 \, [I_1 - 4 \cdot I_2 + 6 \cdot I_3 - 4 \cdot I_4 + I_5]$$

Likewise, a six-set corrected rotation rate $Q_{1-6}$ may be implemented where a constant fourth derivative $\partial^4 B/\partial t^4$ is present, derived as follows:

$$Q_{1-6} = (Q_{1-5} - Q_{2-6})/2 \quad \text{Eqn. (14)}$$

$$= 1/32 \, [I_1 - 5 \cdot I_2 + 10 \cdot I_3 - 10 \cdot I_4 + 5 \cdot I_5 - I_6]$$

While the above rotational rate correction schemes are recommended according to an $n^{th}$ order derivative that is constant, it is not necessary to match an equation or algorithm with a specific order. For example, the linear bias drift $D_1$ may be adequately corrected by any order correction that is three-set or higher. In this regard, a higher order correction scheme may be more robust. However, other factors such as time to heading and the size of the sampling populations required for resolving the indicated rotation rates $I_i$ within a reasonable certainty may favor lower order corrections.

The corrected rotation rates $Q_{i-j}$ may be converted to the heading $\psi_1$ using an equation such as Eqn. (5), or any other method or technique that relates the corrected rotation rate $Q_{i-j}$ to a heading from true north. A drawback of using Eqn. (5) is that the sensed true north rotation rate $Q_N$ will vary generally with the elevation angle $\theta$ and/or the bank angle $\phi$ of the sensing axis S relative to level. Also, even for a perfectly leveled gyrocompass, the sensed true north rotation rate $Q_N$ will vary sinusoidally with the latitude of application, from 15.041 degrees per hour at the equator to zero at either of the poles.

Figure 15:
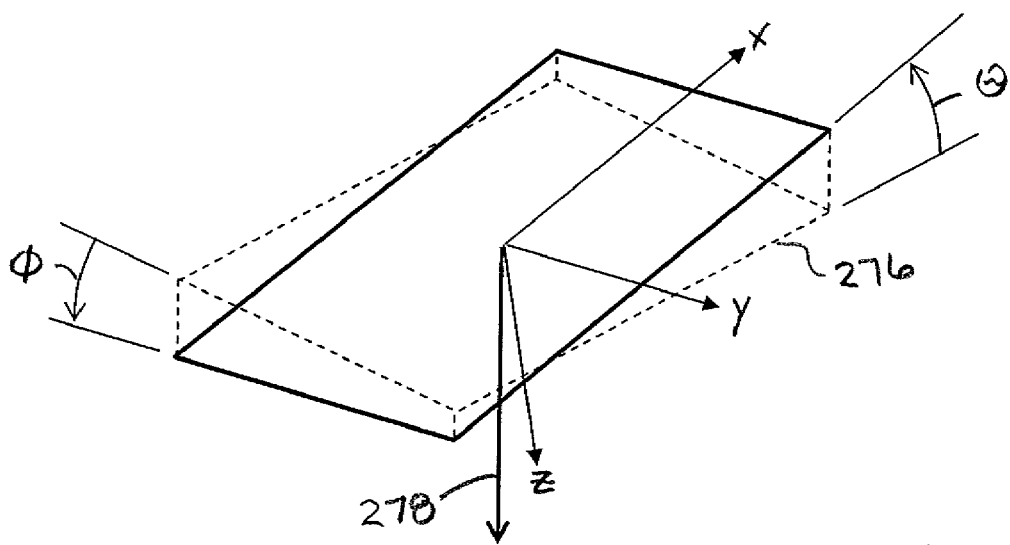
FIG. 15 is a schematic of a coordinate system used in measurement of bank and elevation angles in an embodiment of the invention.

Referring to FIG. 15, a ratiometric method is presented in an embodiment of the invention that normalizes the corrected rotation rates Q with the local sensed true north rotation rate $Q_N$ regardless of the orientation of the measuring device with respect to vertical. The method may be implemented using a gyroscope and an accelerometer that are aligned along a common sensitive axis, such as the single element gyrocompass 80 of FIG. 6, which is used hereafter as a non-limiting device in implementing the method. The rate/acceleration sensing module 82 may be sequentially positioned to sample gravitational accelerations $A_X$, $A_Y$ and $A_Z$ and indicated rotation rates $I_X$, $I_Y$ and $I_Z$ along each of three orthogonal axes X, Y and Z, respectively. Hereinafter, the X, Y and Z axes are referred to in the alternative as the heading axis, the lateral axis, and the elevation axis, respectively, and may be referred to collectively as spatial reference axes. The heading or X-axis is the axis in three-dimensional space along which the pointing vector 120 is oriented during heading measurements. The indicated rotation rates $I_X$, $I_Y$ and $I_Z$ may be corrected to obtain the corrected rotation rates $Q_X$, $Q_Y$ and $Q_Z$, such as by the methods described above. The gravitational accelerations $A_X$, $A_Y$ and $A_Z$ may be used to find angles of bank $\phi$ and elevation $\theta$ relative to a plane 276 that is normal to a local gravitational vector 278 (i.e. a horizontal plane):

$$\phi = \tan^{-}[(-A_Y)/(-A_Z)] \quad \text{Eqn. (15)}$$

$$\theta = \tan^{-1}[A_X/(A_Y \cdot \sin(\phi) + A_Z \cdot \cos(\phi))] \quad \text{Eqn. (16)}$$

The corrected rotation rates Q can be used to find the heading $\psi$. The mathematical expression may depend generally on the type of gyrocompass used (i.e. single, dual or triple). Where a single element gyroscope such as depicted in FIG. 6 is used to determine the corrected rotation rates $Q_X$, $Q_Y$ and $Q_Z$, the scale factors associated with each are equal and may be cancelled ratiometrically:

$$\psi = \tan^{-1}[(-Q_Y \cdot \cos(\phi) + Q_Z \cdot \sin(\phi))/(Q_X \cdot \cos(\theta) + \sin(\theta) \cdot (Q_Y \cdot \sin(\phi) + Q_Z \cdot \cos(\phi)))] \quad \text{Eqn. (17)}$$

Equation (17) may also be utilized for configurations utilizing two gyroscope elements (e.g. FIG. 8). A dual element gyroscope that samples data along two orthogonal axes each may have one axis in common while taking readings on three axes in total. In this case the two readings on the common axis can be used to determine the scale differences of the two sensors such that the scale factors can be equalized for all readings.

For example, consider a two sensor arrangement wherein a first sensor (e.g. module 118a of FIG. 8) is used to determine the corrected rotation rates $Q_{X1}$ and $Q_{Y1}$ and a second sensor (e.g. module 118b of FIG. 8) is used to determine the corrected rotation rates $Q_{Y2}$ and $Q_{Z2}$, where the numbers 1 and 2 in the subscript denote measurements by the first and the second sensor, respectively. Because the corrected rotation rates $Q_Y$ is determined with measurements from both the first and the second sensor, a ratio $K_S$ of the sensor scale factors may be established:

$$K_S = Q_{Y1}/Q_{Y2} \Rightarrow Q_{Y1} = K_S \cdot Q_{Y2} \quad \text{Eqn. (18)}$$

Generally, the ratio $K_S$ may be used to normalize any rotation rate measurement made by the first sensor relative to the second sensor. That is, $$Q_{X1} = K_S \cdot Q_{X2} \quad \text{Eqn. (19)}$$

$$Q_{Z1} = K_S \cdot Q_{Z2} \quad \text{Eqn. (20)}$$

Accordingly, the heading $\psi$ can be determined with a dual sensor gyrocompass by $$\psi = \tan^{-1}[(-Q_{Y1} \cdot \cos(\phi) + K_S \cdot Q_{Z2} \cdot \sin(\phi))/(Q_{X1} \cdot \cos(\theta) + \sin(\theta) \cdot (Q_{Y1} \cdot \sin(\phi) + K_S \cdot Q_{Z2} \cdot \cos(\phi)))] \quad \text{Eqn. (21)}$$

With configurations utilizing three gyroscope elements such as depicted in FIGS. 9A-9C, there is no axis in common while taking readings at 180° offsets. One could rotate the assembly in 90° increments (e.g. at 0°, 90° and 180°), which would generate signals from rotational rate sensors 162a and 162b in a common orientation and enable their normalization with respect to each other. However, such maneuver would not reconcile rotational rate sensor 162c with respect to rotational rate sensors 162a and 162b. The chassis 190 could also be mounted on a rotatable section akin to rotating portion 94 to enable orientation of the rotational rate sensors 162a and 162b in an orientation common to the default position of the rotational rate sensor 162c. However, this would require the same amount of time as a comparable dual sensor measurement.

To realize an added time advantage with the triple element gyrocompass 160, in certain embodiments one can forego normalization of the rotational rate sensors 162a, 162b and 162c with respect to each other and rely on a priori determinations of the scale factor to effect the correction. It is further noted that gyroscope systems that actively control drive amplitude are often characterized by scale factor differences that may not be significant in some heading applications. For example, it is commonplace to have scale factor differences known or predicted to less than 1% uncertainty; such a level of uncertainty would only produce 0.3 degrees of uncertainty in the heading indication.

The earth latitude coordinate γ at which the single element gyrocompass 80 was located during the above measurement sequence may also be inferred:

$$\gamma = \tan^{-1}[(-Q_{X'}\sin(\theta) + (Q_{Y'}\sin(\phi) + Q_{Z'}\cos(\phi))\cdot\cos(\theta))/ (_{X'}\cos(\theta)\cdot\cos(\psi) + Q_{Y'}(\sin(\phi)\cdot\sin(\theta)\cdot\cos(\psi) - \cos(\phi)\cdot\sin(\psi)) + Q_{Z'}(\cos(\phi)\cdot\sin(\theta)\cdot\cos(\psi) + \sin(\phi)\cdot\sin(\psi)))] \quad \text{Eqn. (22)}$$

Equation (22) is directed to a single sensor gyrocompass. The same principles discussed in relation to determination of the heading ψ with multiple sensors may also be utilized for the earth latitude coordinate γ.

Referring back to the discussion attendant FIGS. 6 and 7, the single element gyrocompass 80 may be capable of executing the positioning and measurements for the methods described above. The perpendicular relationship between the axis of rotation R and the longitudinal or second axis of rotation 90 enables alignment of the sensitive axis 104 of the rate/acceleration sensing module 82 to be aligned with an X-, Y- and Z-axis coordinate system of arbitrary orientation.

For example, consider an application where the longitudinal axis 90 of the single element gyrocompass 80 is closer to a horizontal orientation than to a vertical orientation. In this case, the gyro resonator 100 may be rotated about the axis of rotation R 180° using the gear train 86 and the motive driver 88 for execution of Eqns. (4) through (14) to establish the heading or X-axis and determine the heading ψ. The gear train 86 and the motive driver 88 may also be used to measure along the lateral or Y-axis by rotating 90° relative to the X-axis. Where the single element gyrocompass 80 is configured for a rotational range 89 about the axis of rotation R is 270° or greater, measurements may also be performed in both directions along the lateral or Y-axis. The second motive driver 98 may be used to align the sensitive axis 104 of the gyro resonator 100 along the elevation or Z-axis. The latter measurements along the Y- and Z-axes enable execution of Eqns. (15) through (21).

In situations where the single element gyrocompass 80 is oriented so that the longitudinal axis 90 is closer to vertical than horizontal, a rotation of 180° about the axis of rotation R using the gear train 86 and the motive driver 88 still enables execution of Eqns. (4) through (14) to establish the heading or X-axis and determine the heading ψ. Where the single element gyrocompass 80 is configured for a rotational range 89 about the axis of rotation R is 270° or greater, the measurements along the elevation or Z-axis may be accomplished. The second motive driver 98 enables alignment of the sensitive axis 104 of the gyro resonator 100 along the lateral or Y-axis.

The dual element gyrocompass 116 enables acquisition of data along two axes (e.g. along the X- and Y-axes) simultaneously. The ability to acquire such simultaneous measurement may cut the overall data acquisition sequence to approximately ⅔ that of the single element gyrocompass 80.

Figure 16A:
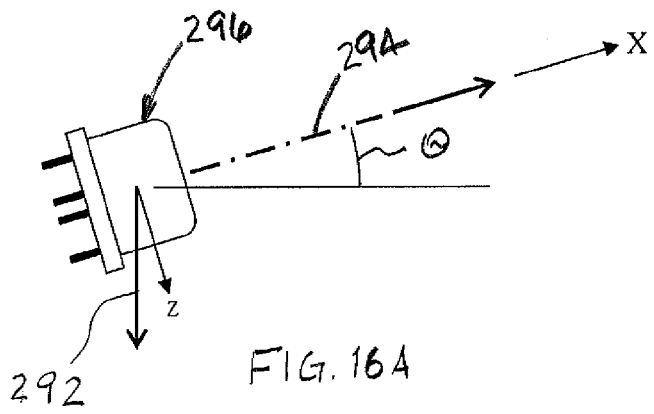
FIG. 16A is an elevation view of an accelerometer in an embodiment of the invention.
Figure 16B:
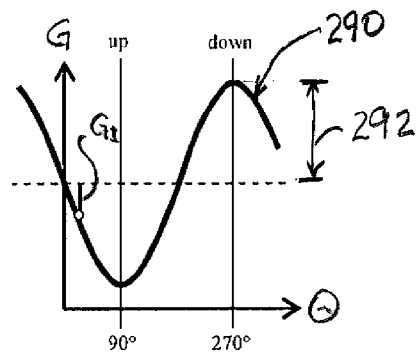
FIG. 16B depicts a signal output of the accelerometer of FIG. 16A.
Figure 16C:
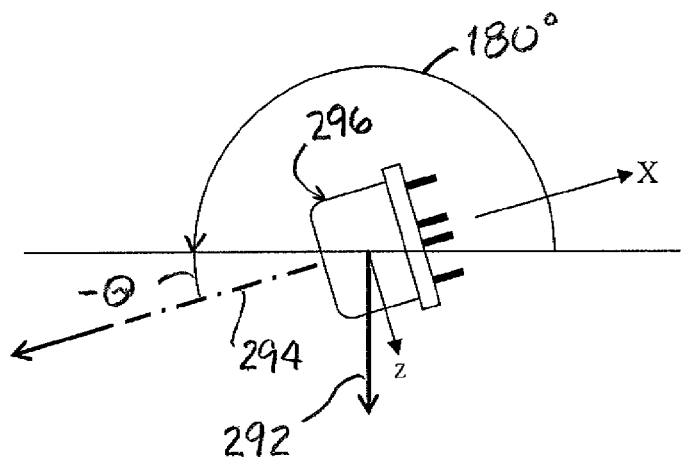
FIG. 16C is an elevation view of the accelerometer of FIG. 16A in an orientation that is 180° offset from the orientation of FIG. 16A.
Figure 16D:
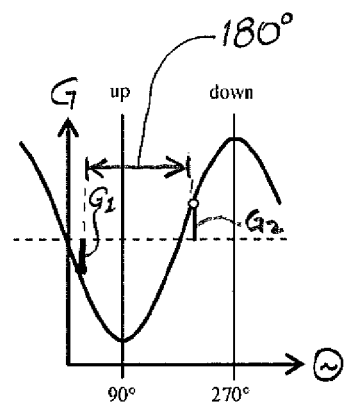
FIG. 16D depicts a signal output of the accelerometer of FIG. 16C.

Referring to FIGS. 16A through 16D, a sensed component 290 of a local gravitational acceleration 292 that is sensed along a sensitive axis 294 of an accelerometer 296 (such as the accelerometer 92 of the single element gyrocompass 80) is depicted in an embodiment of the invention. Generally, the sensed component 290 is in proportion to the sine of an angle of inclination of the sensitive axis 294 relative to horizontal, such as the elevation angle θ. Ergo, a first sensed gravitational acceleration $G_1$ sensed by the accelerometer 292 is proportional to the sine of the elevation angle θ or other angle of inclination (FIGS. 16A and 16B). Because of the sinusoidal relationship between the sensed component 290 and the angle of inclination such as the elevation angle θ, a second sensed gravitational acceleration $G_2$ sensed by the accelerometer 296 with the sensitive axis 294 offset 180° relative to the first orientation will be substantially equal and opposite to the first sensed gravitational acceleration $G_1$ (FIGS. 16C and 16D). This relationship is akin to the relationship between the earth's angular rate vector 51 and the angular rate sensor 22 in the above discussion.

Moreover, accelerometers and rate sensing gyroscopes may have similar errors from signal noise, bias and drift. That is, the representative output of a gyrocompass depicted in FIG. 12 may be generally applicable to accelerometers, with the ordinate indicating an indicated sensed component instead of an indicated angular rate. Thus, methodologies for the correction of gyroscope data may generally apply to correction of accelerometer data. Accordingly, the gravitational acceleration measurements made along each of the heading, lateral and elevation axes X, Y and Z may be corrected using the same multiple data set correction methods presented herein for the correction of rotation rate.

In more generic terms, the corrective methods outlined herein may be applied generally to devices or sensors subject to bias and bias drift and that sense a component vector (e.g. sensed acceleration or rotation rate) of a total vector (e.g. gravitational acceleration or rotational vector of the earth), where the relationship between the component and total vectors is sinusoidal.

The preceding discussions are tailored to a gyroscope and an accelerometer that are oriented on axes parallel to or concentric with each other. Generally, any relative orientation between the gyroscope and accelerometer may be utilized (e.g. the arbitrary angle 119 of FIG. 7B) as long as the relationship is known.

Figure 17:
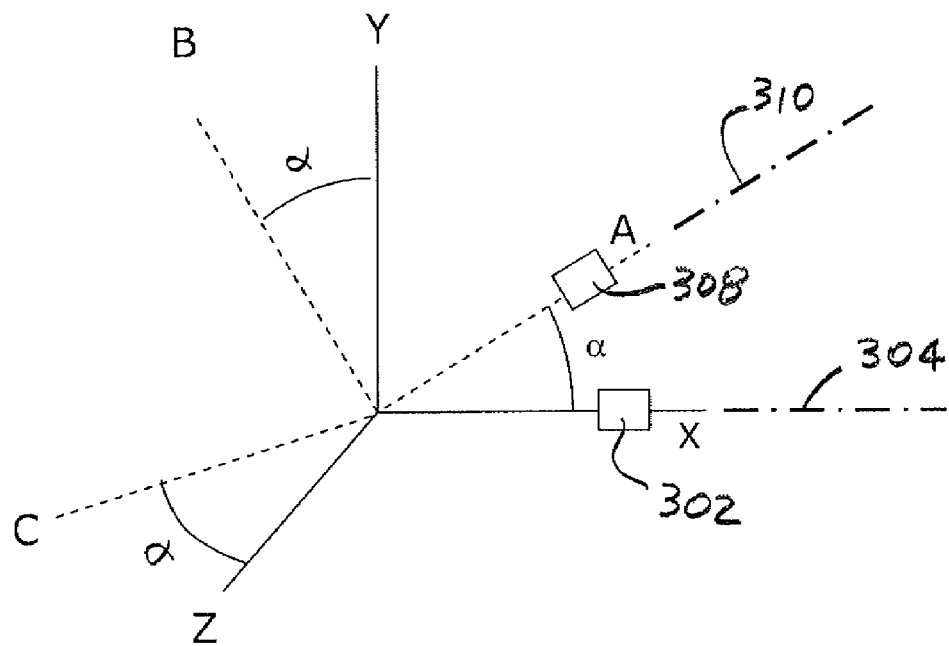
FIG. 17 is a representation of a three-dimensional relationship between rotational rate sampling axes and gravitational acceleration sampling axes for an accelerometer having a sensitive axis that is not parallel with the sensing axis of a gyro resonator in an embodiment of the invention.

Referring to FIG. 17, consider an example configuration 300 wherein a gyro resonator 302 having a sensing axis 304 and an accelerometer 308 having a sensitive axis 310 are arranged such that the sensing axis 304 and the sensitive axis 310 are not concentric or parallel with respect to each other. In this particular example, sampling axes for the gyro resonator are depicted by the Cartesian coordinates X, Y and Z, and the sensitive axis 310 of the accelerometer 308 lies on the same plane as the X- and Y-sampling axes and is fixedly offset from the sensing axis 304 of the gyro resonator 302 by a projected angle α.

When the sensing axis 304 of the gyro resonator 302 defines the X-axis, the sensitive axis 310 of the accelerometer 308 defines a sampling axis A. Likewise, when the gyro resonator 302 is oriented with the sensing axis 304 along the Y-axis, a sampling axis B is defined by the accelerometer 308. In the example configuration 300, the sampling axes A and B lie on the same plane as the X- and Y-sampling axes. Also in the example configuration 300, when the gyro resonator 302 is oriented with the sensing axis 304 along the Y-sampling axis, a sampling axis C is defined by the accelerometer 308 that lies on the same plane as the X- and Z-sampling axes.

In this example configuration 300, the orientation of the X-sampling axis is arbitrary, with the Y- and Z-sampling axes being orthogonal thereto define the Cartesian coordinate system. The sampling axes A, B and C do not define a Cartesian system because the plane defined by sampling axes A and B is not orthogonal with the plane defined by sampling axes B and C.

Data acquired by the accelerometer 308 in the example configuration 300 may be converted to represent equivalent data that would have been acquired had the sensitive axis 310 been in alignment with or parallel with the X-, Y- and Z-sampling axes:

$$A_X = A_A \cdot \cos(\alpha) - A_B \cdot \sin(\alpha) \qquad \text{Eqn. (23)}$$

$$A_Y = A_A \cdot \sin(\alpha) + A_B \cdot \cos(\alpha) \qquad \text{Eqn. (24)}$$

$$A_Z = A_X \cdot \tan(\alpha) - A_C \cdot \cos(\alpha) \qquad \text{Eqn. (25)}$$

where $A_A$, $A_B$ and $A_C$ are the gravitational accelerations along the sampling axes A, B and C, respectively. The gravitational accelerations $A_X$, $A_Y$ and $A_Z$ thus acquired may be used in Eqns. (15) and (16) and for subsequent determination of the heading $\psi$, the elevation angle $\theta$ and/or the bank angle $\phi$.

Those skilled in the art will recognize that other configurations may be readily converted using similar conversion techniques. Conversion formulations for Euler coordinates is provided in the Appendix and may be utilized for any relationship existing between the sampling axes A, B and C and the X-, Y- and Z-sampling axes.

In practice, the projected angle $\alpha$ may be readily compensated where the projected angle $\alpha$ is less than about 45° or greater than about 135°. For projected angles $\alpha$ in the approximate range of 45° to 135°, larger sampling populations may be required because of the smaller fraction (weaker signal) that is converted from one axis sensing axis onto the other, particularly as the projected angle $\alpha$ approaches 90°.

In fact, if the projected angle $\alpha$ is substantially 90° (e.g. the gyro resonator 100 aligned with the X-axis and the accelerometer 110 aligned on the Y-axis) then the accelerometer will sample along only two axes (e.g. +Y, –X and –X axes) when the gyro samples along the +X, +Y and +Z axes, respectively. Because no component of the accelerometer data correspond to the Z-axis acceleration data, a fourth set of data would be required to obtain the Z-axis acceleration data for a projected angle $\alpha$ of 90°.

The various apparatus and method embodiments disclosed above may require the gyrocompass and gyroscope to be substantially stationary during data acquisition, leading to a general underground surveying method that is novel. In the context of borehole surveying, the method includes selecting a vibrating element gyroscope configured for insertion into the borehole and inserting the vibrating element gyroscope a distance into the borehole. The gyroscope is caused to become substantially stationary at the distance and used to obtain a plurality of indicated angular rotation rates while the gyroscope is substantially stationary. The plurality of indicated angular rotation rates are then used to cancel a bias associated with the indicated angular rotation rates to provide a plurality of corrected angular rotation rates. The corrected angular rotation rates are then used to infer a heading direction of the gyroscope. The process may be repeated at several locations along the borehole to provide a mapping of the borehole.

The invention may be practiced in other applications of determination of a heading or direction not disclosed herein. Unless otherwise indicated or inferred from the context, references to relative terms such as upper and lower, front and back, left and right, or the like, are intended for convenience of description and are not contemplated to limit the invention, or its components, to any specific orientation. All dimensions and sizes of components relative to each other as depicted in the figures may vary with a potential design and the intended use of a specific embodiment of this invention without departing from the scope thereof.

Those skilled in the art will appreciate that while portions of the discussion above are directed primarily at vibrating element gyroscopes, various methods or portions of methods disclosed herein may be applied to certain inertial rate gyroscopes that do not include vibrating elements, and to other devices that experience linear/non-linear bias or linear/non-linear bias drift.

Each of the features and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

For purposes of interpreting the claims for the present invention, it is expressly intended that the provisions of Section 112, sixth paragraph of 35 U.S.C. are not to be invoked unless the specific terms "means for" or "steps for" are recited in the subject claim.

What is claimed is:

1. A method for correcting a bias error, comprising:
   (a) selecting a sensor having a sensitive axis, said sensor sensing a component vector of a total vector about said sensitive axis, said component vector having a magnitude proportional to a sine or a cosine of an angle between said component vector and said total vector;
   (b) orienting said sensor in a first orientation that defines a first direction, said sensitive axis defining a spatial reference axis;
   (c) measuring a set of signals from said sensor while said sensor is stationary in said first orientation, said set of signals being representative of said component vector and including at least one signal;
   (d) orienting said sensor in a second orientation that defines a second direction, said sensitive axis being substantially parallel with said spatial reference axis, said second direction being substantially opposite said first direction;
   (e) repeating step (c) with said sensor in said second orientation;
   (f) alternating between the orientations of steps (b) and (d) and performing step (c) after each alternating to obtain a plurality of sets of signals, said plurality of sets of signals numbering at least three;
   (g) converting said plurality of signals to a corresponding plurality of component vectors;
   (h) calculating a plurality of first order corrected component vectors for determining said spatial reference axis based on first order derivatives of said plurality of component vectors;
   (i) calculating a higher order corrected component vector for determining said spatial reference axis, said higher order corrected component vector being based at least in part on said plurality of first order corrected component vectors and on a higher order derivative of said plurality of component vectors, said higher order derivative being at least a second order derivative; and
   (j) inferring said spatial reference axis from said higher order corrected component vector.

2. The method of claim 1 wherein said step of calculating the higher order corrected component vector includes step for calculating a higher order corrected component vector.

3. The method of claim 1, wherein said sensor is a gyroscope, said total vector is the earth's rotational vector, said spatial reference axis is a heading axis, each of said plurality of component vectors is a rate of rotation, and said higher order corrected component vector is a corrected rate of rotation.

4. The method of claim 3 further comprising determining a heading direction from said corrected rate of rotation.

* * * * *